US012707123B2

(12) United States Patent
Kim

(10) Patent No.: US 12,707,123 B2
(45) Date of Patent: Aug. 11, 2026

(54) DISPLAY DEVICE AND OPERATION METHOD THEREOF

(71) Applicant: SAMSUNG ELECTRONICS CO., LTD., Suwon-si (KR)

(72) Inventor: Bongjoe Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/906,959

(22) Filed: Oct. 4, 2024

(65) Prior Publication Data

US 2025/0030920 A1 Jan. 23, 2025

Related U.S. Application Data

(63) Continuation of application No. PCT/KR2023/003773, filed on Mar. 22, 2023.

(30) Foreign Application Priority Data

Apr. 4, 2022 (KR) ........................ 10-2022-0041908

(51) Int. Cl.

*H04N 21/472* (2011.01)
*H04N 21/422* (2011.01)
*H04N 21/466* (2011.01)

(52) U.S. Cl.

CPC . *H04N 21/47205* (2013.01); *H04N 21/42204* (2013.01); *H04N 21/4666* (2013.01)

(58) Field of Classification Search

CPC ....... H04N 21/47205; H04N 21/42204; H04N 21/4666

See application file for complete search history.

(56) References Cited

U.S. PATENT DOCUMENTS

| | | | | |
|---|---|---|---|---|
| 11,406,899 | B2 | 8/2022 | Kolen et al. | |
| 11,443,537 | B2 | 9/2022 | Lee et al. | |
| 11,593,615 | B2 | 2/2023 | Hua et al. | |
| 2021/0228985 | A1 * | 7/2021 | Matsushita | A63F 13/52 |

(Continued)

FOREIGN PATENT DOCUMENTS

| | | | |
|---|---|---|---|
| KR | 10-1182034 | B1 | 9/2012 |
| KR | 10-2018-0047913 | A | 5/2018 |

(Continued)

OTHER PUBLICATIONS

International Search Report and Written Opinion (PCT/ISA/210 and PCT/ISA/237) dated Jun. 30, 2023, issued by International Searching Authority for International Application No. PCT/KR2023/003773.

*Primary Examiner* — Yassin Alata
(74) *Attorney, Agent, or Firm* — Sughrue Mion, PLLC

(57) ABSTRACT

A display device includes a display, an image receiver configured to receive video content having a first style, a memory storing one or more instructions and including one or more neural networks, and at least one processor configured to execute the one or more instructions stored in the memory to execute the one or more instructions to obtain a feature corresponding to a second style, transfer, by the one or more neural networks, a style of frame images of the video content from the first style to the second style based on the feature, and control the display to display frame images having the second style.

15 Claims, 15 Drawing Sheets

(56) References Cited

U.S. PATENT DOCUMENTS

| | | | |
|---|---|---|---|
| 2021/0312671 A1 | 10/2021 | Liu et al. | |
| 2022/0108431 A1* | 4/2022 | Baran | G06N 3/0455 |
| 2022/0253970 A1 | 8/2022 | Ahn et al. | |

FOREIGN PATENT DOCUMENTS

| | | |
|---|---|---|
| KR | 10-2020-0122177 A | 10/2020 |
| KR | 10-2229572 B1 | 3/2021 |
| KR | 10-2021-0040882 A | 4/2021 |
| KR | 10-2021-0088656 A | 7/2021 |
| KR | 10-2021-0108529 A | 9/2021 |
| KR | 10-2296906 B1 | 9/2021 |
| KR | 10-2022-0026252 A | 3/2022 |
| KR | 10-2022-0027565 A | 3/2022 |
| KR | 10-2022-0040251 A | 3/2022 |
| KR | 10-2623148 B1 | 1/2024 |

* cited by examiner 100
20
100
10

START
RECEIVE IMAGE CONTENT HAVING FIRST STYLE
S210
OBTAIN STYLE FEATURE CORRESPONDING TO SECOND STYLE
S220
TRANSFER, BASED ON STYLE FEATURE, STYLE OF IMAGE CONTENT FROM FIRST STYLE TO SECOND STYLE
S230
DISPLAY IMAGE CONTENT HAVING STYLE TRANSFERRED TO SECOND STYLE
S240
END 630
820
SECOND NEURAL NETWORK
812
851
803
DOWNSCALING
811
830
840

920
1101
1140
DOWNSCALING
1151
1103
1150
1110
FIRST NEURAL NETWORK
1120
SECOND NEURAL NETWORK
1130
THIRD NEURAL NETWORK
1102

100
130
MEMORY
110
120
140
IMAGE RECEIVER
PROCESSOR
DISPLAY
150
WIRELESS COMMUNICATION UNIT
1000
CONTROL DEVICE

DISPLAY DEVICE AND OPERATION METHOD THEREOF

CROSS-REFERENCE TO RELATED APPLICATIONS

This application is a continuation of International Application No. PCT/KR2023/003773, filed on Mar. 22, 2023, which is based on and claims priority to Korean Patent Application No. 10-2022-0041908, filed on Apr. 4, 2022, in the Korean Intellectual Property Office, the disclosures of which are incorporated by reference herein in their entireties.

BACKGROUND ART

1. Field

The disclosure relates to a display device and an operation method thereof. More particularly, the disclosure relates to a display device for transferring a style of image/video content and an operation method of the display device.

2. Description of the Related Art

A display device is a device having a function of displaying images that a user is able to view. The user is able to watch a broadcast via a display device. The display device displays on a display a broadcast selected by the user among broadcast signals transmitted by a broadcasting station. In addition, smart televisions (TVs) that offer a variety of content in addition to broadcasting functions are available. A smart TV does not passively operate according a user's selection, but performs the function of analyzing and providing what the user wants without the user's manipulation.

Accordingly, the user may utilize a display device to perform various functions in addition to watching broadcasts. For example, the user may execute game content by using a display device, and the display device may offer a game mode capable of providing an optimal environment for executing the game content.

On the other hand, when playing a game for a long period of time, the user may become bored with the same graphics (e.g., game skin) of the game content and want new graphics. However, graphics in the game content cannot be converted by the user in any way the user wishes, but may be converted using graphics transformation software (e.g., a game skin-pack) provided by a game manufacturer, etc. Most of this software is paid for, and the types of software provided by game manufacturers or the like are limited, and thus there is a problem in that needs of users cannot be satisfied.

SUMMARY

Additional aspects will be set forth in part in the description which follows and, in part, will be apparent from the description, or may be learned by practice of the presented embodiments.

According to an aspect of the disclosure, a display device includes a display, an image receiver configured to receive video content having a first style, a memory storing one or more instructions and including one or more neural networks, and at least one processor configured to execute the one or more instructions stored in the memory to execute the one or more instructions to obtain a feature corresponding to a second style, transfer, by the one or more neural networks, a style of frame images of the video content from the first style to the second style based on the feature, and control the display to display frame images having the second style.

The memory may be configured to store at least one of a plurality of features or a plurality of style images corresponding to a plurality of styles. The display device may further include a wireless communication unit configured to receive a user input for selecting one of the plurality of styles. The at least one processor may be further configured to obtain the feature corresponding to the one of the plurality of styles selected in the user input.

The at least one processor may be further configured to execute the one or more instructions to obtain a style image having the second style, and extract the feature from the style image via a feature extraction network.

The display device may further include a communication unit configured to communicate with an external device. The at least one processor may be further configured to execute the one or more instructions to control the communication unit to receive the style image from the external device.

The display device may further include a wireless communication unit configured to receive a user input for switching an operation of the display device to a game mode. The at least one processor may be further configured to execute the one or more instructions to control the display device to operate in the game mode based on the user input for switching the operation of the display device to the game mode, and provide a user interface for selecting the feature based on the display device operating in the game mode. In a state in which the display device is operating in the game mode, the video content may be game content.

The at least one processor may be further configured to execute the one or more instructions to control the display to display a style settings menu for selecting one of a plurality of styles based on the display device operating in the game mode.

The at least one processor may be further configured to execute the one or more instructions to extract feature information of a first frame image among the frame images by using a first neural network, and obtain the first frame image having the style transferred to the second style by inputting the feature information and the feature to a second neural network.

The at least one processor may be further configured to execute the one or more instructions to extract, by a third neural network, the feature from a style image corresponding to the second style.

The at least one processor may be further configured to execute the one or more instructions to obtain a downscaled version of a second frame image that is included in a same scene as the first frame image, and obtain the second frame image having the style transferred to the second style by inputting the feature information, the feature, and the downscaled version of the second frame image to the second neural network.

According to another aspect of the disclosure, an operation method of a display device may include receiving video content having a first style, obtaining a feature corresponding to a second style, transferring, one or more neural networks, a style of frame images of the video content from the first style to the second style based one the feature, and displaying the frame images having the second style.

The operation of the display device may further include storing at least one of a plurality of features or a plurality of style images, corresponding to a plurality of styles, and receiving a user input for selecting one of the plurality of styles. The obtaining of the feature corresponding to the second style may include obtaining the feature corresponding to the one of the plurality of styles selected in the user input.

The operation of the display device may further include obtaining a style image having the second style. The obtaining of the feature corresponding to the second style may include extracting the feature from the style image via a feature extraction network.

The obtaining of the style image corresponding to the second style further may include receiving the style image from an external device.

The operation of the display device may further include receiving a user input for switching an operation of the display device to a game mode, operating, by the display device, in the game mode based on the user input, and providing a user interface for selecting the feature based on the display device operating in the game mode. In a state in which the display device is operating in the game mode, the video content may be game content.

A non-transitory computer-readable recording medium having stored thereon may include a program for performing the operation of the display device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
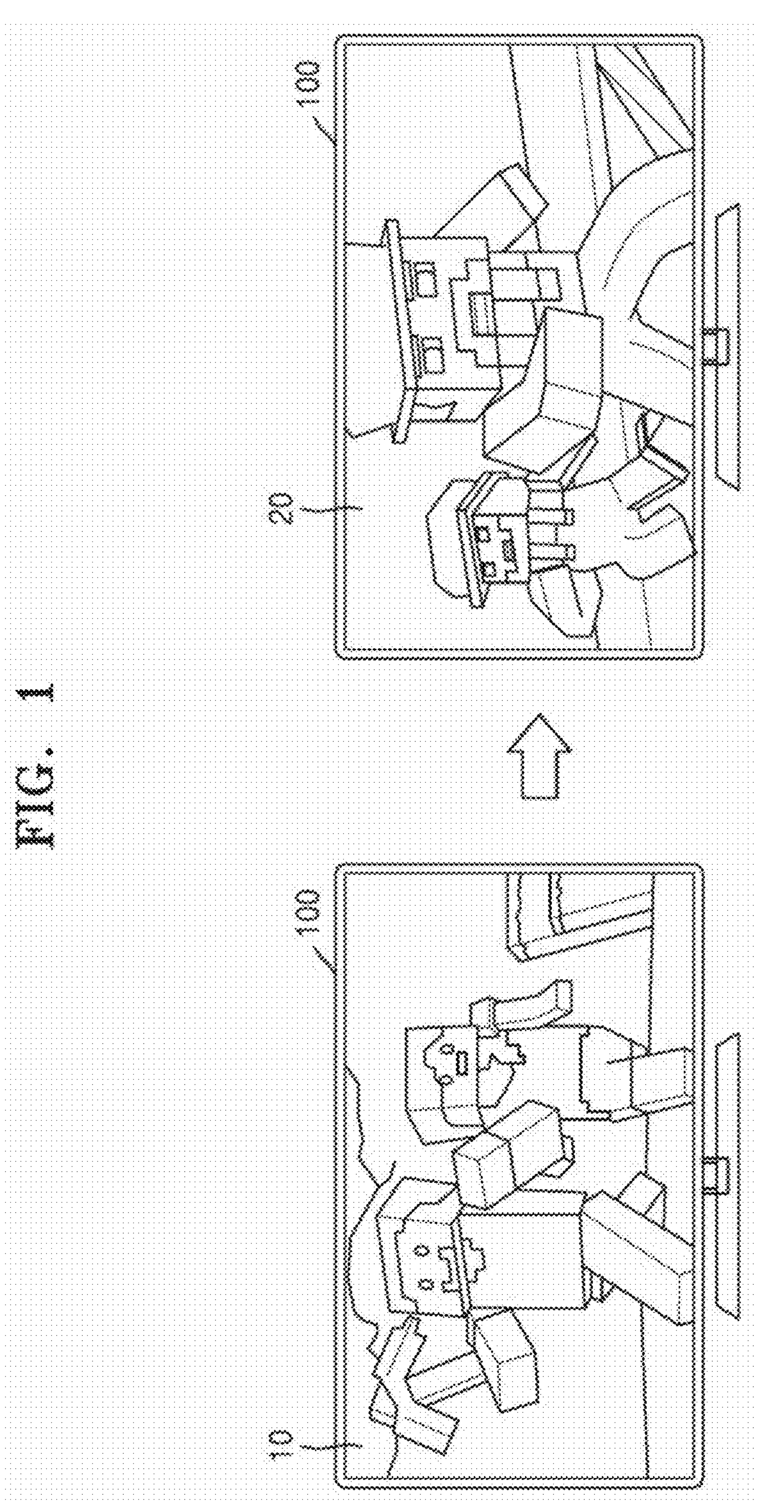
FIG. 1 is a diagram illustrating a display device according to some embodiments.

Terms used in the present specification will now be briefly described and then the present disclosure will be described in detail.

As the terms used herein, general terms that are currently widely used are selected by taking functions according to the present disclosure into account, but the terms may be changed according to the intention of one of ordinary skill in the art, precedent cases, advent of new technologies, or the like. Furthermore, specific terms may be arbitrarily selected by the applicant, and in this case, the meaning of the selected terms will be described in detail in the detailed description of the present disclosure. Thus, the terms used in the present disclosure should be defined not by simple appellations thereof but based on the meaning of the terms together with the overall description of the present disclosure.

Throughout the specification, when a part "includes" or "comprises" an element, unless there is a particular description contrary thereto, it is understood that the part may further include other elements, not excluding the other elements. In addition, terms such as "portion", "module", etc., described in the specification refer to a unit for processing at least one function or operation and may be implemented as hardware or software, or a combination of hardware and software.

Embodiments will be described more fully hereinafter with reference to the accompanying drawings so that they may be easily implemented by one of ordinary skill in the art to which the present disclosure belongs. However, the present disclosure may be implemented in different forms and should not be construed as being limited to embodiments set forth herein. In addition, parts not related to descriptions of the present disclosure are omitted to clearly explain the present disclosure in the drawings, and like reference numerals denote like elements throughout.

In an embodiment of the specification, the term "user" refers to a person who controls a system, a function, or an operation, and may include a developer, an administrator, or an installation technician.

In addition, in an embodiment of the specification, an 'image' or a 'picture' may refer to a still image, or a moving picture composed of a plurality of consecutive still images (or frames), or a video. The term "image content" and "video content" are used interchangeably.

The term "at least one or 'A', 'B', and/or 'C'" may refer to each and every combination of A, B and C. For example, "at least one of A, B, or C" may refer to only A, only B, only C, only A and B, only A and C, only B and C, or all of A, B, and C.

FIG. 1 is a diagram illustrating a display device according to some embodiments.

Referring to FIG. 1, a display device 100 according to some embodiments may include any electronic device capable of visually outputting image content. For example, the display device 100 may be implemented in various forms such as a TV, a mobile phone, a tablet PC, a digital camera, a camcorder, a laptop computer, a desktop, an e-book terminal, a digital broadcasting terminal, a personal digital assistant (PDA), a portable multimedia player (PMP), a navigation device, an MP3 player, a wearable device, etc. Also, the display device 100 may be a stationary electronic device placed at a fixed location or a mobile electronic device having a portable form, and may be a digital broadcasting receiver capable of receiving a digital broadcast. In particular, embodiments may be easily implemented in an image processing device with a large display, such as a TV, but are not limited thereto.

According to some embodiments, the display device 100 may transmit and receive data to and from an external device via a wireless communication network. In this case, the external device may be a server, an electronic device, or the like that is able to communicate with the display device 100 via the wireless communication network. In detail, the external device may transmit and receive certain data to and from the display device 100, may be paired with the display device 100, may remotely control the display device 100, or may be remotely controlled by the display device 100.

According to some embodiments, the display device 100 may receive image content from the external device and output the image content. For example, the display device 100 may receive game content from a gaming device (e.g., a gaming console, a PC, etc.) connected to the display device 100 and display the game content on a display.

Furthermore, according to some embodiments, the display device 100 may provide a game mode optimized for output of the game content. For example, the game mode may provide a function of reducing or eliminating input lag, screen tearing, screen distortion, etc. that may occur when game content is transmitted from the gaming device to the display device 100. Furthermore, the game mode may provide a high dynamic range (HDR) feature that optimizes a contrast ratio to display sharp game images with a high quality. In addition, the game mode may allocate more resources to image processing of game content than the normal mode. However, the game mode is not limited thereto.

On the other hand, in the case of game content, the user cannot arbitrarily convert graphics in the game content, and needs to be provided with graphics transformation software (e.g., a skin pack) offered by a game manufacturer or the like to convert the graphics in the game content. Because the user must passively receive the skin pack, it may not be possible to provide a desired type of skin pack at a desired time. Therefore, it is not possible to satisfy needs of the user.

According to some embodiments, the display device 100 may transfer the style of the game content by using image processing for the game content without converting the graphics in the game content, and accordingly, produce the same effect as applying a new skin pack to the game content.

Referring to FIG. 1, according to some embodiments, the display device 100 may receive image content from an external device and perform style transfer on the received image content. Alternatively, the display device 100 may perform style transfer on image content prestored in the display device 100. In this case, style transfer may refer to converting the style of an image to a specific form while maintaining the content of the image. A style may be determined based on lines, colors, textures, brightness, saturation, atmosphere, etc. that appear in the image. The style may also be in the form of a painting style such as watercolor, oil painting, ink painting, pointillism, or three-dimensional (3D) painting, or may refer to a specific artist's painting style such as Van Gogh style, Monet style, or Picasso style. However, the style is not limited thereto.

According to some embodiments, the display device 100 may apply a style transfer technique to image content, in particular, game content. For example, when a user outputs game content by using the display device 100, the display device 100 may transfer a style of the game content and output the resulting game content without converting graphics of the game content. The display device 100 may transfer a game image 10 of the game content having a first style to a game image 20 having a second style and output the game image 20. In this case, the display device 100 may convert only the style of the game content to a specific form while maintaining the content of the game content. Transferring the style of game content may mean converting the appearance of characters, a background style, etc. while maintaining content features of the characters or background that appear in the game, similar to changing a game skin. However, the present disclosure is not limited thereto.

Furthermore, according to some embodiments, the display device 100 may include a display and display style-transferred game content on the display.

A method, performed by the display device 100, of performing style transfer on image content, according to some embodiments, is described in detail below with reference to the drawings.

Figure 2:
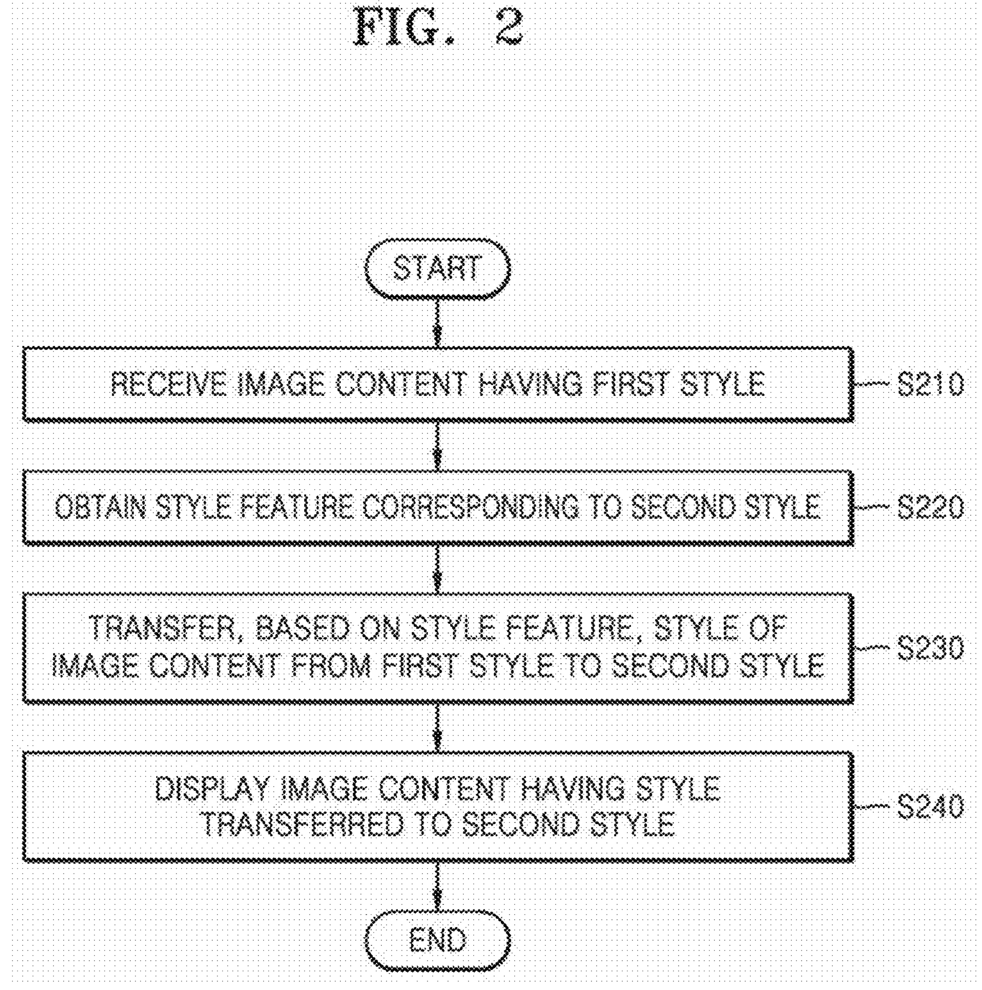
FIG. 2 is a flowchart of an operation method of a display device, according to some embodiments.

FIG. 2 is a flowchart of an operation method of a display device, according to some embodiments.

Referring to FIG. 2, according to some embodiments, the display device 100 may receive image content (S210).

According to some embodiments, the display device 100 may receive image content from an external device or an external server. For example, the display device 100 may receive the image content via a communication interface or an input/output (I/O) interface. Alternatively, the display device 100 may load image content previously stored in a memory.

According to some embodiments, the image content may include not only still image content but also a moving image or video content, and may include game content, etc. However, the image content is not limited thereto. The received image content may have a first style.

According to some embodiments, the display device 100 may obtain a style feature corresponding to a second style that is different from the first style (S220).

The display device 100 may prestore a plurality of style images. The display device 100 can receive a plurality of style images from an external device and store the plurality of style images. The display device 100 may obtain a style feature from a style image selected based on a user input from among the plurality of style images. The style feature may be feature information extracted from the style image. By inputting the style image to one or more neural networks, the display device 100 may extract the style feature corresponding to the style image. In this case, the style image may be an image having a specific pattern or format of style. For example, the style image may include, but is not limited to, an image representing a specific artist's painting style, an image representing a specific format, an image representing a specific character, an image representing a specific texture, etc.

Alternatively, the display device 100 may prestore style features corresponding to the plurality of style images. The display device 100 may store style features extracted by inputting style images to one or more neural networks, or may receive style features obtained from an external device. However, the present disclosure is not limited thereto.

The display device 100 may obtain one style feature selected based on a user's input from among the plurality of prestored style features.

The display device 100 may transfer the style of the image content from the first style to the second style based on the style feature obtained in operation 220 (S220) (S230).

A method, performed by the display device 100, of performing style transfer on image content, according to some embodiments, is described in detail below with reference to FIGS. 6 to 11B.

The display device 100 may display style-transferred image content (S240).

Figure 3:
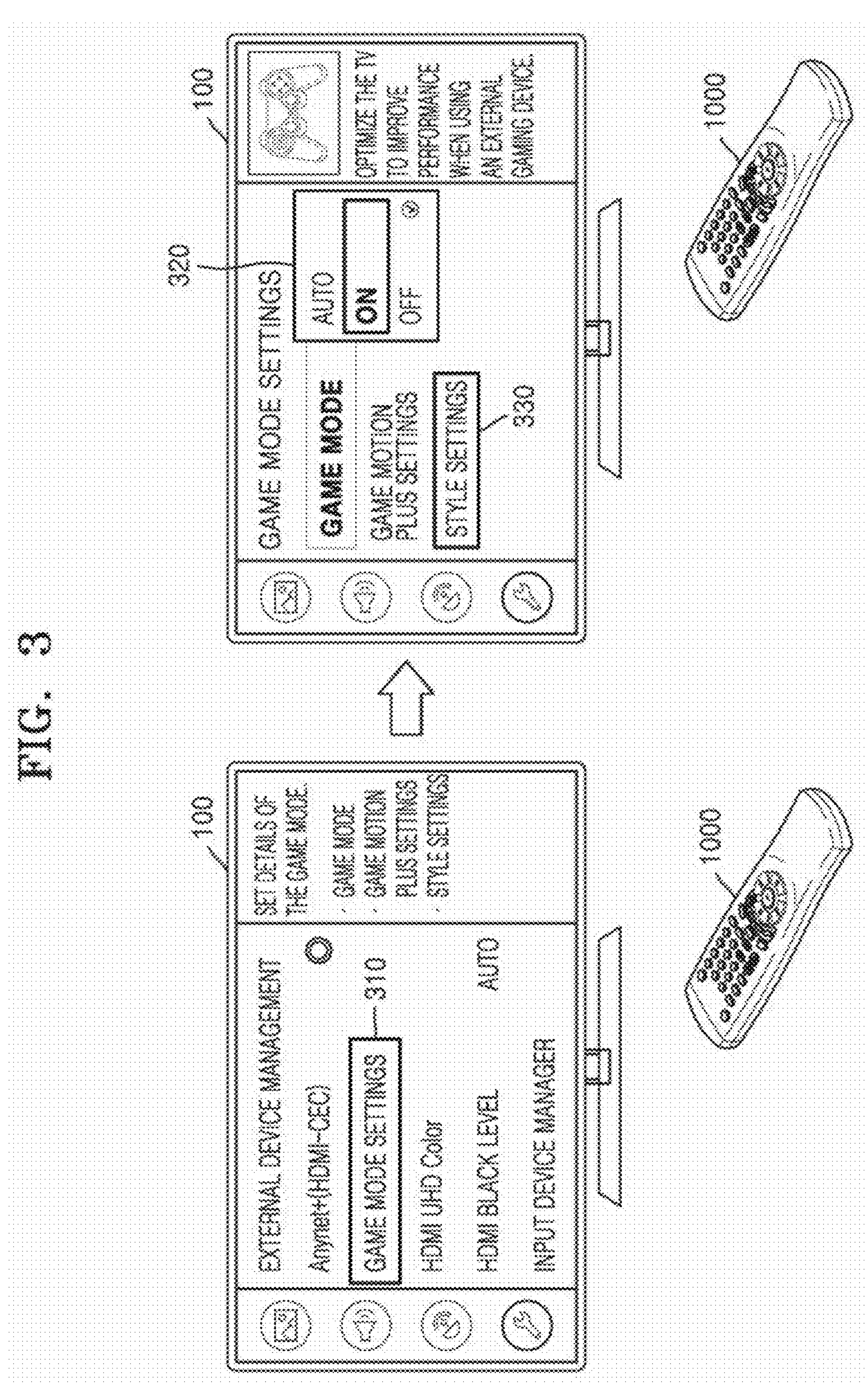
FIG. 3 is a diagram illustrating a method of operating a display device in a game mode, based on a user input, according to some embodiments.

FIG. 3 is a diagram illustrating a method of operating a display device in a game mode based on a user input, according to some embodiments.

Referring to FIG. 3, a display device 100 according to some embodiments may provide a function for setting a game mode. For example, the display device 100 may include a game mode settings menu 310 in an external device management menu.

A user of the display device 100 may transmit a control signal, a control command, or the like corresponding to a user input (e.g., a key or button input on the control device, etc.) to the display device 100 by using a control device 1000 or the like. The display device 100 may receive a control signal, a control command, or the like from the control device 1000 and perform an operation corresponding to the user input.

As shown in FIG. 3, when the game menu settings menu 310 is selected based on a user input, the display device 100 may display a menu 320 that provides a function of automatically turning on or off the game mode, a function of manually turning on the game mode, and a function of manually turning off the game mode.

Furthermore, the display device 100 may display menus for various features provided by the game mode (e.g., a Game Motion Plus settings feature, a FreeSync feature, a style settings feature, etc.). The menus for various features provided by the game mode may be displayed as disabled when the game mode is off, or enabled when the game mode is on. However, the present disclosure is not limited thereto.

As shown in FIG. 3, the display device 100 may provide a style settings menu 330 for setting a style for game content in the game mode.

When the style settings menu 330 is selected based on a user input, the display device 100 may display a menu for setting a style. This is described in detail with reference to FIG. 4.

Figure 4:
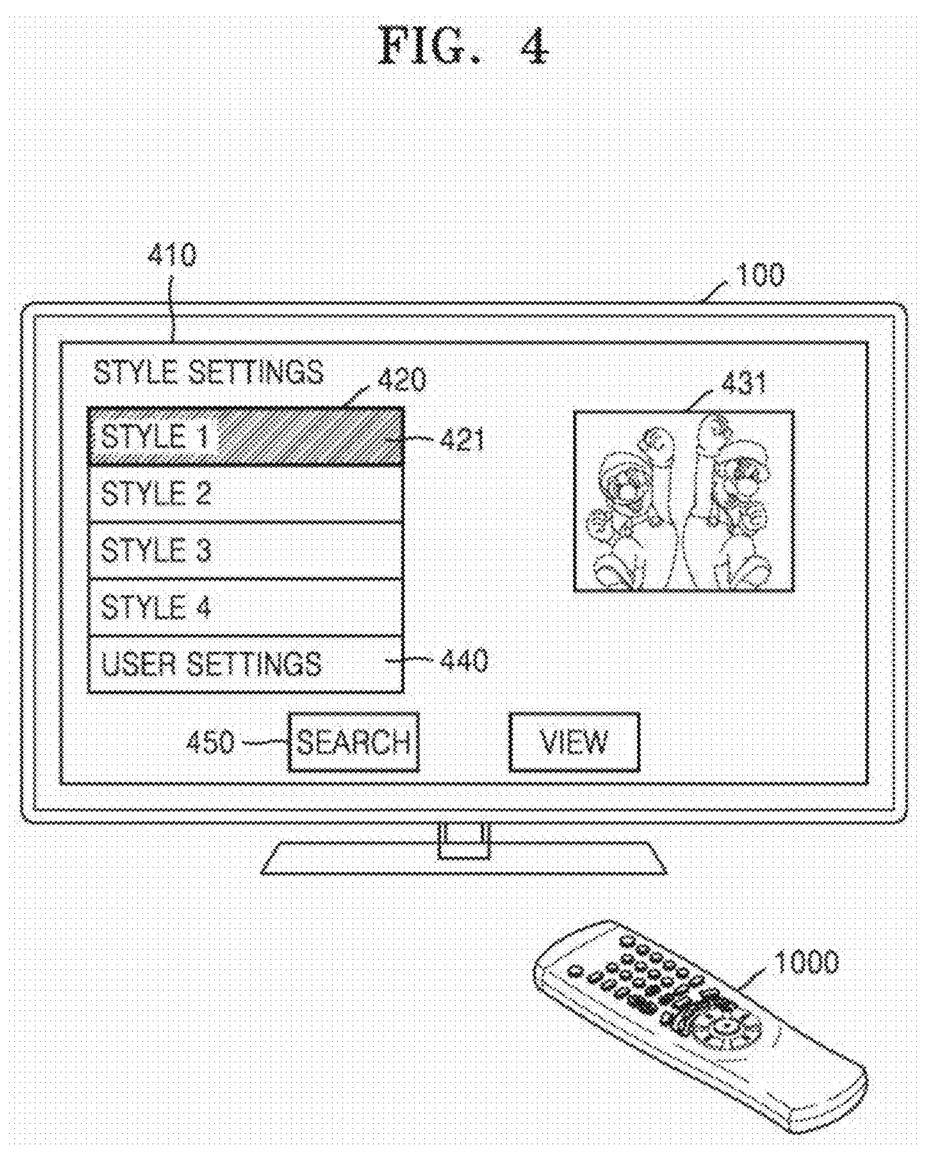
FIG. 4 is a diagram illustrating a method, performed by a display device, of setting a style of image content, based on a user input, according to some embodiments.

FIG. 4 is a diagram illustrating a method, performed by a display device, of setting a style of image content based on a user input, according to some embodiments.

Referring to FIG. 4, according to some embodiments, the display device 100 may display a style settings screen 410 when the style settings menu 330 is selected based on the user input, as described with reference to FIG. 3.

The style settings screen 410 may include a list 420 representing a plurality of styles prestored in the display device 100. For example, the list 420 may include a first item 421 representing style 1, a second item representing style 2, a third item representing style 3, and a fourth item representing style 4. When one of the first to fourth items is selected based on a user input, the display device 100 may display a style image corresponding to the selected item. For example, when the first item 421 is selected, the display device 100 may highlight the first item 421 and display a style image 431 for the style 1 represented by the first item 421. Accordingly, the user may view a style image represented by each of the plurality of styles.

Furthermore, the style settings screen 410 may include a user settings item 440. The user may select the user settings item 440 and input a style image. This is described in detail with reference to FIG. 5.

Furthermore, the style settings screen 410 may display a search item 450. When the search item 450 is selected based on a user input, the user may search for a style by entering a keyword for the style.

In addition, according to some embodiments, the display device 100 may download or update styles from an external device or server periodically or based on a user input.

Figure 5:
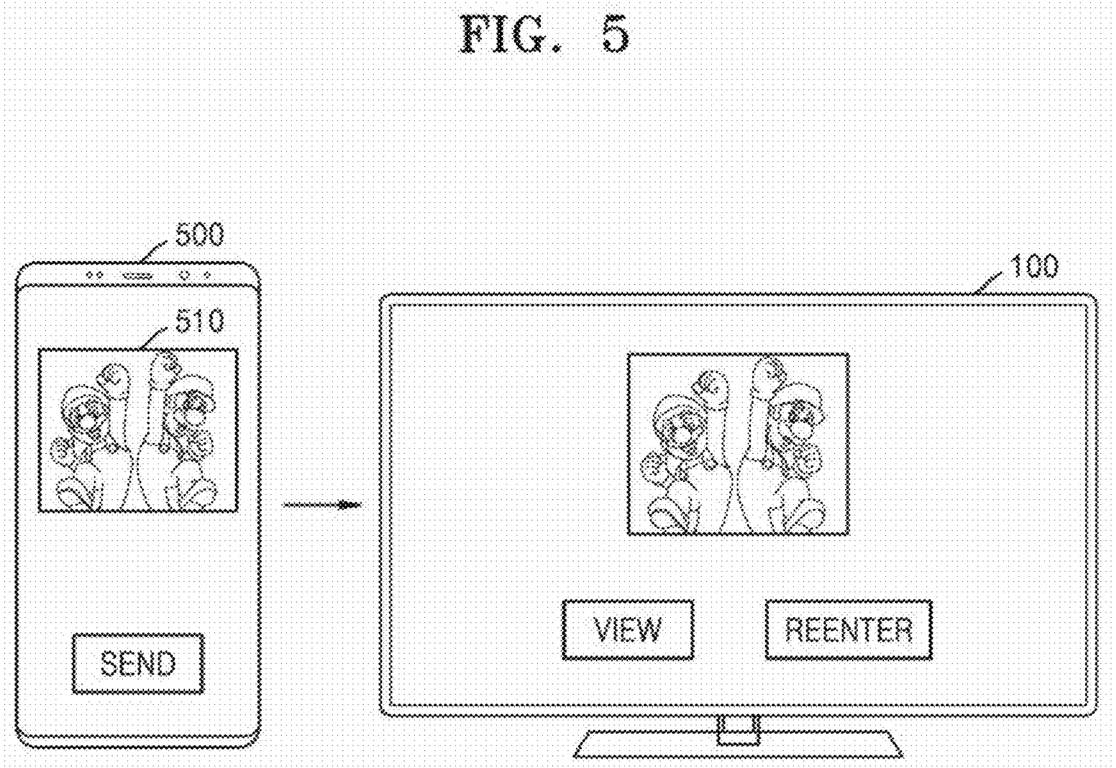
FIG. 5 is a diagram illustrating an example in which a display device receives a style image from an external device, according to some embodiments.

FIG. 5 is a diagram illustrating an example in which a display device receives a style image from an external device, according to some embodiments.

Referring to FIG. 5, a display device 100 according to some embodiments may receive a style image from a mobile device 500. The mobile device 500 may be a mobile computing device, such as a wearable device, a smartphone, a tablet PC, a PDA, a laptop computer, or the like.

Furthermore, the mobile device 500 may be interconnected with the display device 100 by a Home Internet of Things (IoT) platform. Furthermore, the mobile device 500 may be paired with the display device 100 via a wireless network. The mobile device 500 may also remotely control the display device 100, and transmit and receive data to and from the display device 100 so that the display device 100 performs a certain service or a certain operation.

According to some embodiments, when the user settings item 440 shown and described in FIG. 4 is selected, the display device 100 may operate in a state in which it is able to receive data from the mobile device 500. Accordingly, the mobile device 500 may transmit a style image 510 to the display device 100.

When the style image received from the mobile device 500 is set to a style to be transferred, the display device 100 may extract a style feature from the style image.

An operation in which the display device 100 transfers a style of image content based on a style feature is described in detail with reference to FIG. 6.

Figure 6:
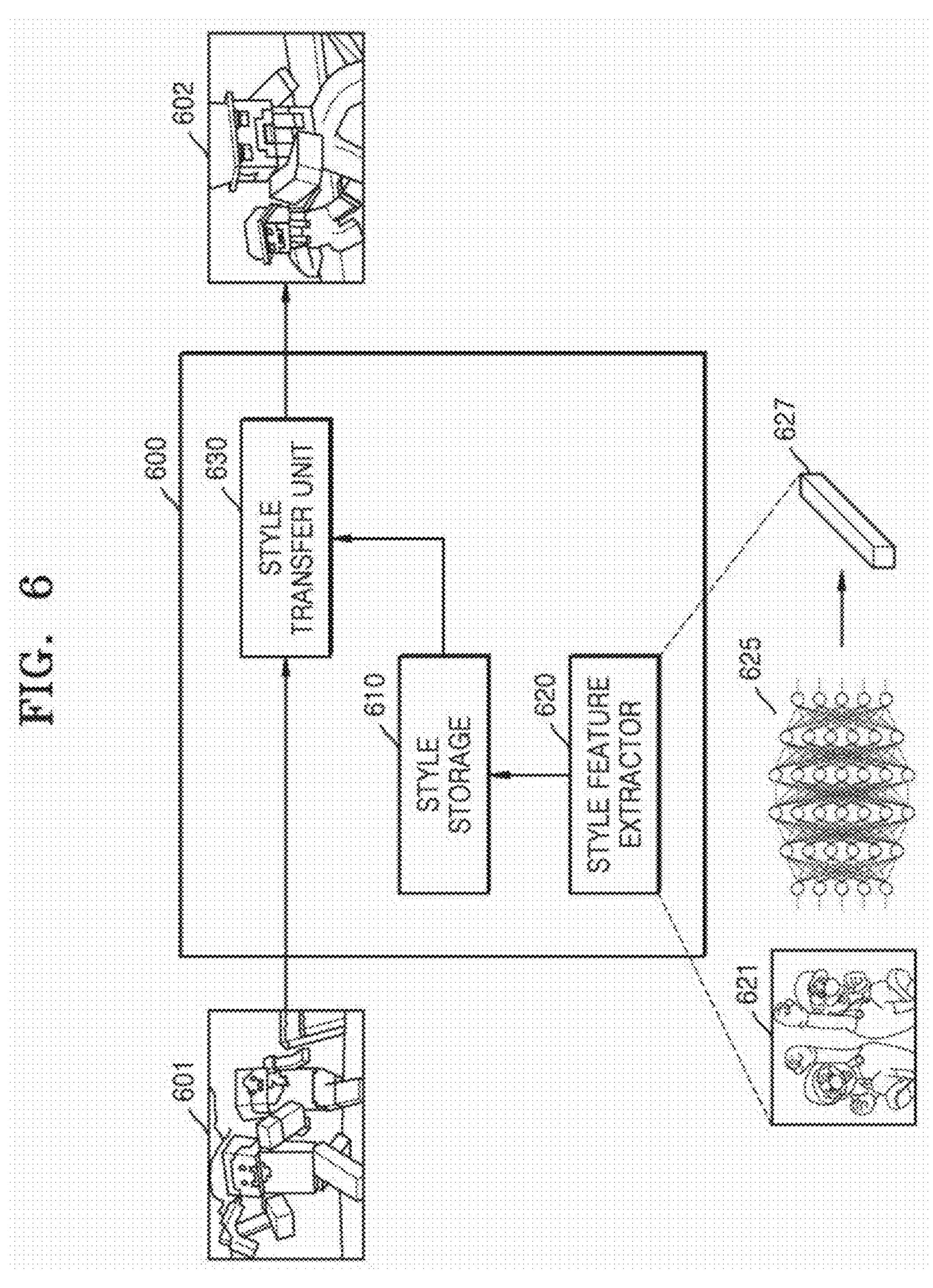
FIG. 6 is a diagram illustrating a device (or module) for performing style transfer on image content, according to some embodiments.

FIG. 6 is a diagram illustrating a device (or module) for performing style transfer on image content, according to some embodiments.

Figure 12:
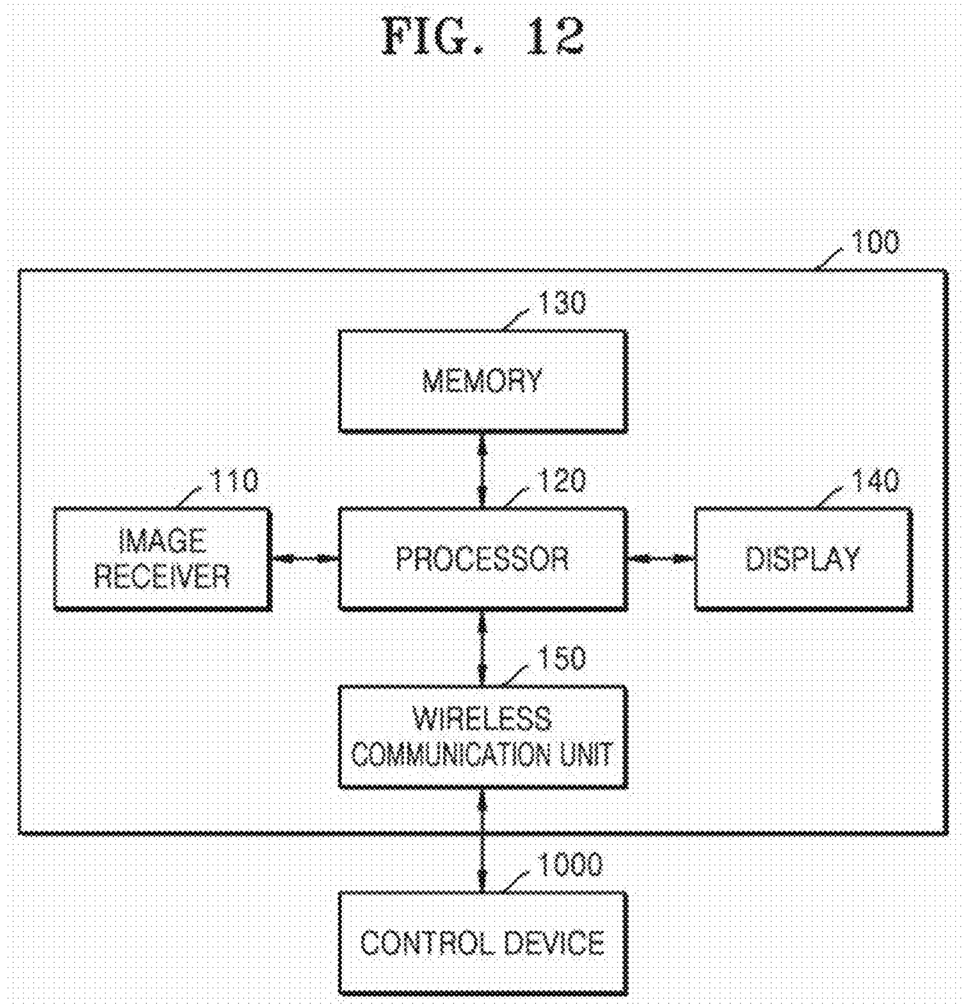
FIG. 12 is a block diagram of a configuration of a display device according to some embodiments.
Figure 13:
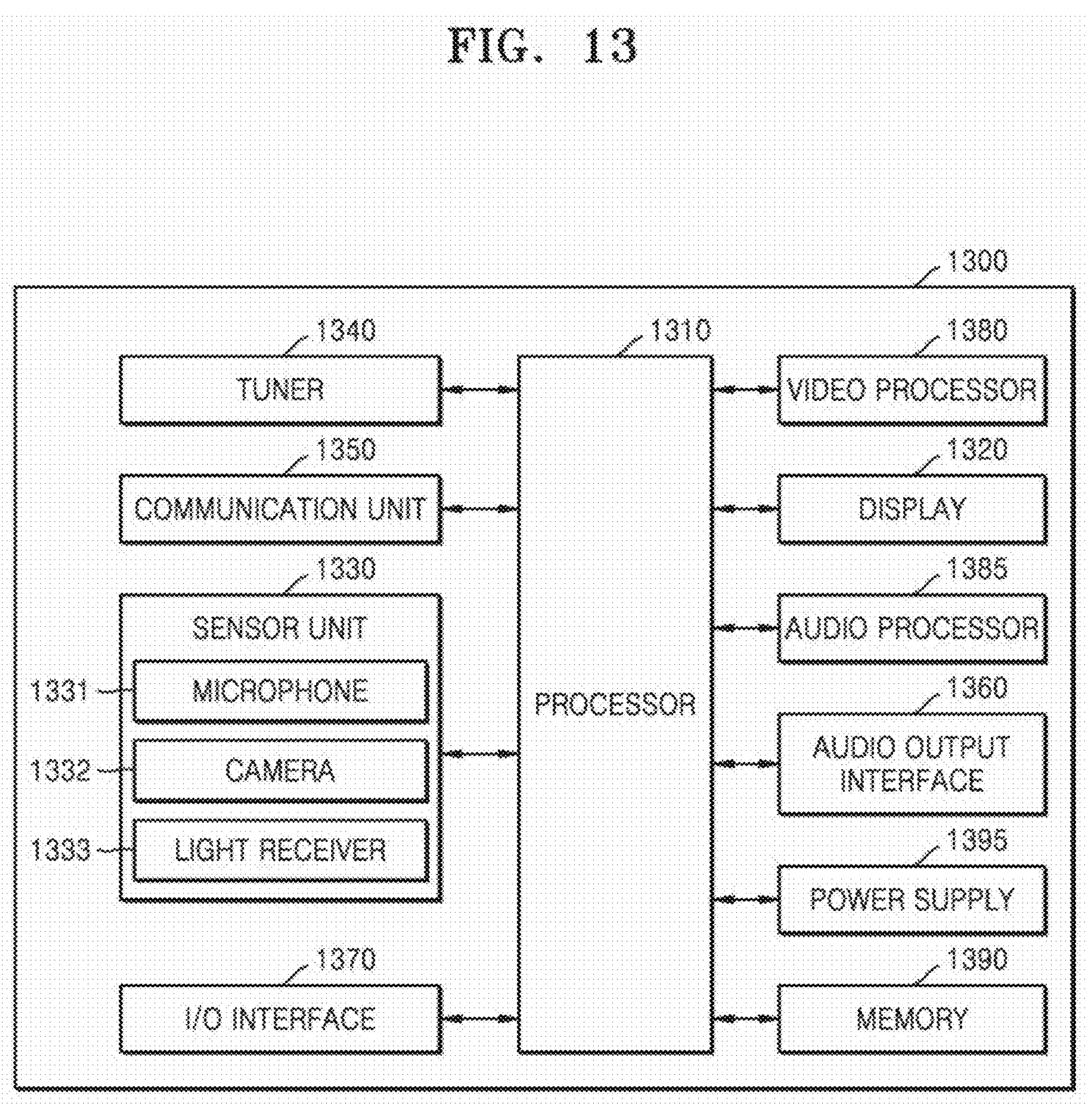
FIG. 13 is a block diagram of a configuration of a display device according to some embodiments.

A style transfer device (or module) 600 according to some embodiments may be included in a part of a display device 100 shown in FIG. 12 or in a part of a display device 1300 shown in FIG. 13.

Referring to FIG. 6, according to some embodiments, the style transfer device (or module) 600 may include a style storage 610, a style feature extractor 620, and a style transfer unit 630.

The style storage 610 may store a plurality of style features corresponding to a plurality of style images. A style feature may refer to feature information extracted from a style image. For example, a style feature may be extracted from a style image by using a style feature extraction network including one or more neural networks.

The style storage 610 may store a plurality of style features received from an external device. In addition, the style storage 610 may store style features extracted by the style feature extractor 620.

The style feature extractor 620 may include appropriate logic, circuitry, interface, and/or code operable to extract style features.

The style feature extractor 620 may extract a style feature 627 from a style image 621 by using a style feature extraction network 625 including one or more neural networks. The style image 621 may be an image having a specific pattern or format of style. For example, the style image 621 may include, but is not limited to, an image representing a specific artist's painting style, an image representing a specific format, an image representing a specific character, an image representing a specific texture, etc. The style image 621 may be input to the style feature extraction network 625, and the style feature extraction network 625 may output the style feature 627 corresponding to the style image 621. The extracted style features may be stored in the style storage 610.

The style transfer unit 630 may include the one or more neural networks. The style transfer unit 630 may include appropriate logic, circuitry, interface, and/or code operable to transfer the style of input image content.

A configuration of the style transfer unit 630 is described in detail with reference to FIG. 7.

Figure 7:
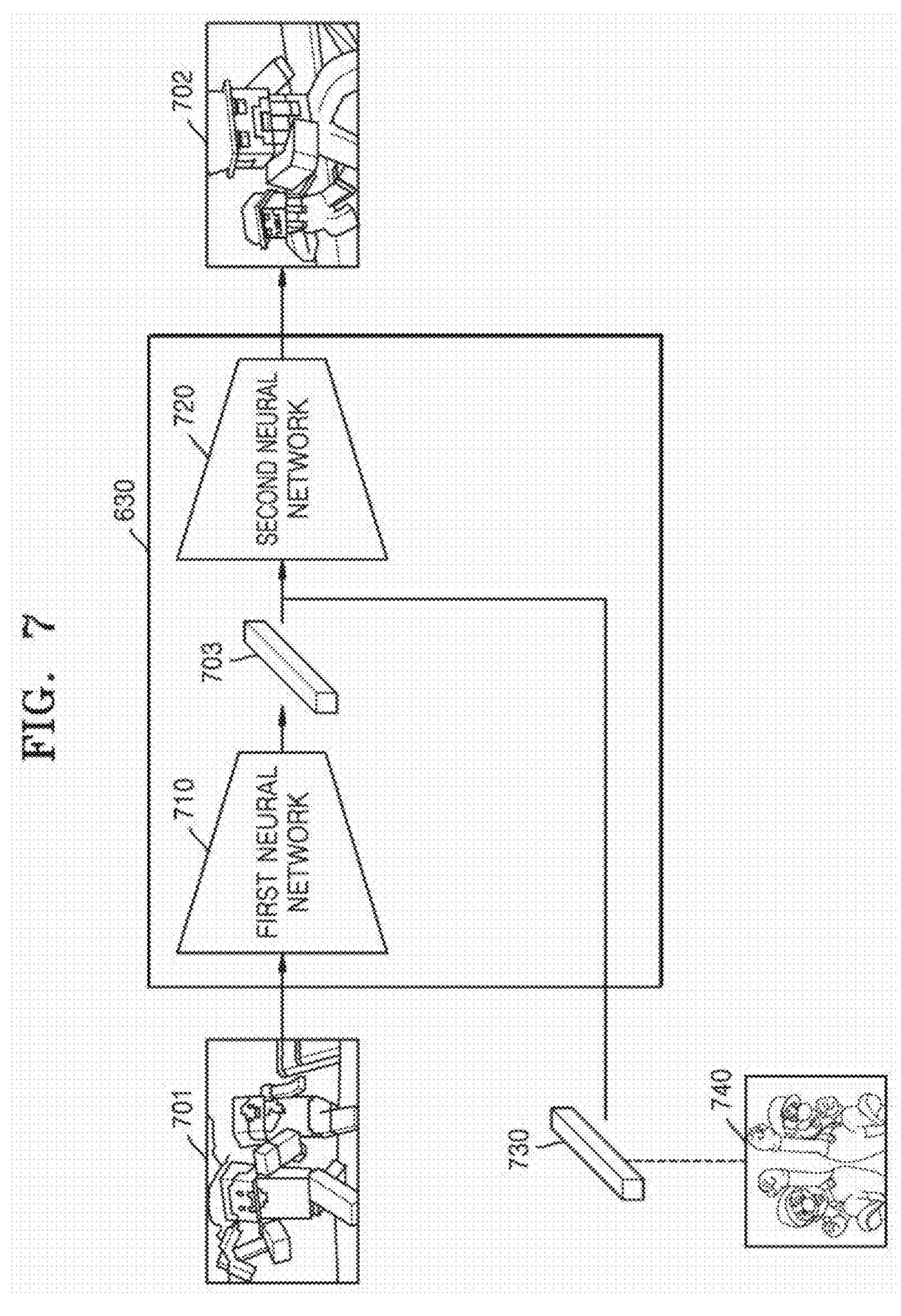
FIG. 7 is a diagram illustrating a style transfer unit according to some embodiments.

FIG. 7 is a diagram illustrating a style transfer unit according to some embodiments.

Referring to FIG. 7, the style transfer unit 630 may include a first neural network 710 and a second neural network 720. Here, the first neural network 710 may be referred to as an encoder network, and the second neural network 720 may be referred to as a decoder network.

The first neural network 710 may be a network trained to take image content 701 as an input and extract feature information about the image content.

When the image content is a moving image or video content, each of frame images included in the video content may be input to the first neural network 710. The first neural network 710 may output feature information about each of the frame images (input images). In this case, feature information 703 extracted by the first neural network 710 may represent a feature of content of an input image.

The second neural network 720 may be a network trained to take the feature information 703 about the input image, which is extracted using the first neural network 710, and a style feature 730 as inputs and output a style-transferred image 702.

For example, when the image content input to the first neural network 710 has a first style and the style feature 730 input to the second neural network 720 corresponds to a second style 740, the second neural network 720 may output the image content 702 having the second style 740. The image content 702 output from the second neural network 720 may be image content having the same content as the image content 701 input to the first neural network 710 while having only the style transferred from the first style to the second style.

Figure 8A:
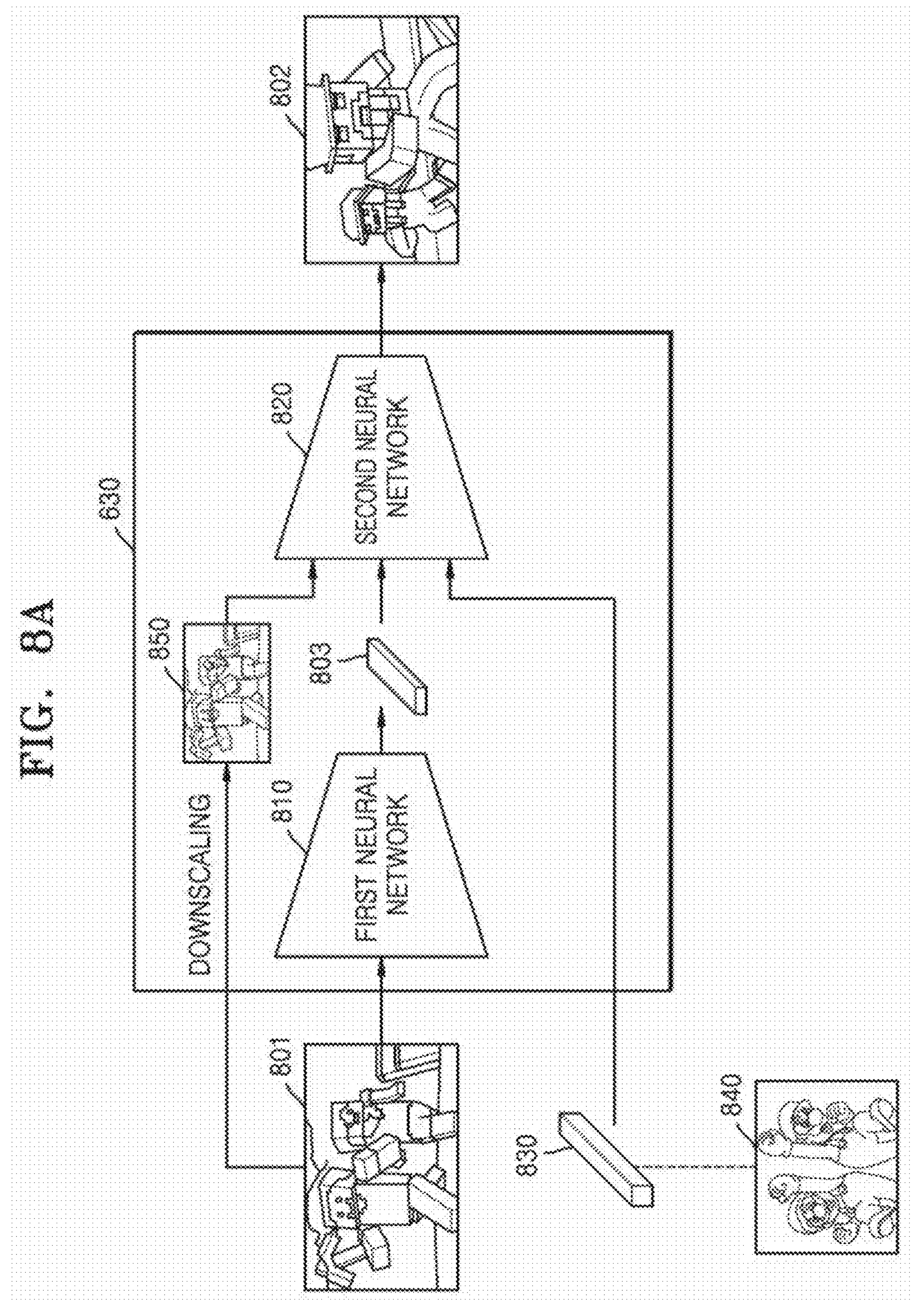
FIGS. 8A and 8B are diagrams illustrating a method, performed by a display device, of performing style transfer on video content, according to some embodiments.
Figure 8B:
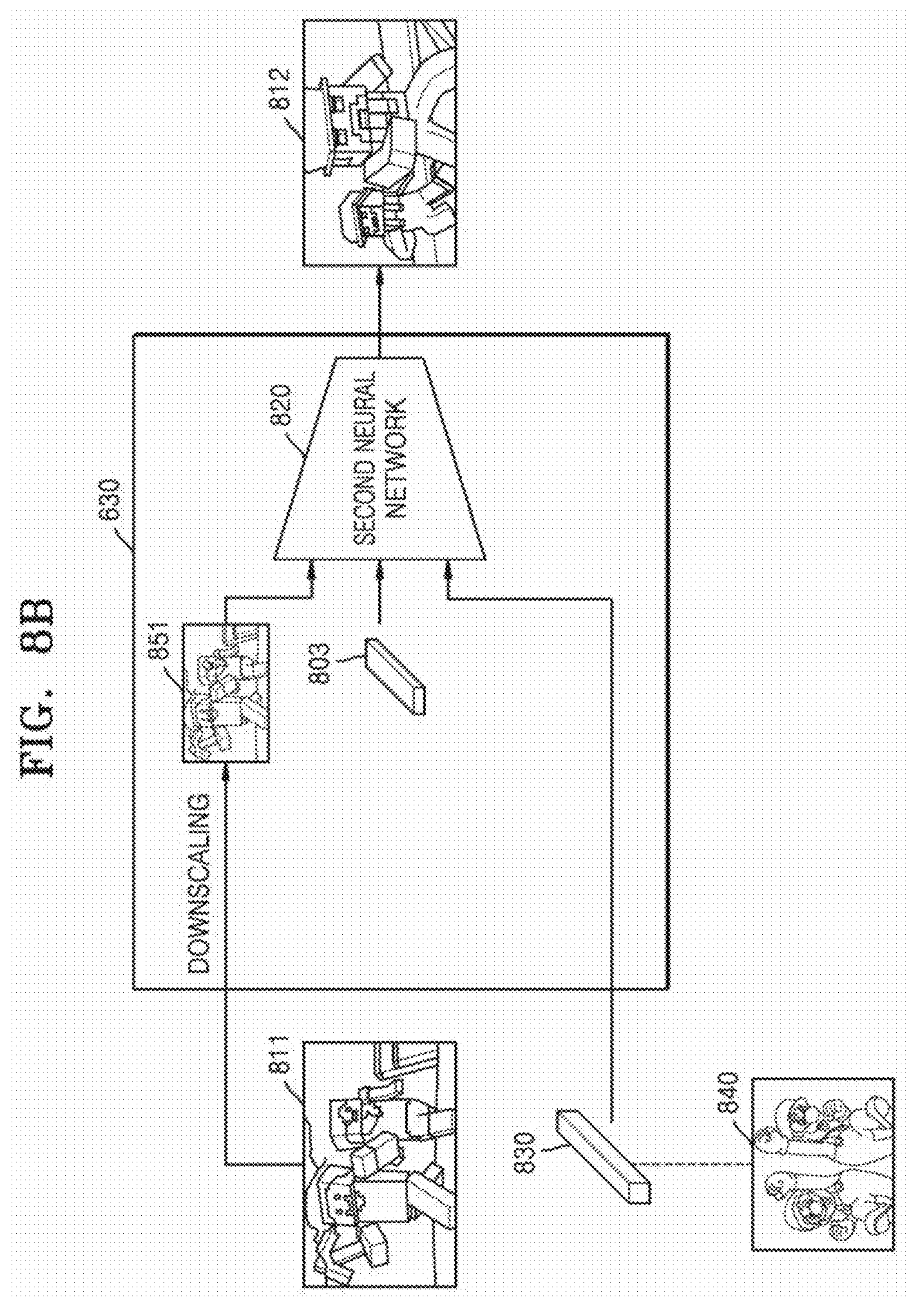

FIGS. 8A and 8B are diagrams illustrating a method, performed by a display device, of performing style transfer on video content, according to some embodiments.

According to some embodiments, the display device 100 may detect a change of a scene in frame images included in received video content. Here, the scene may refer to a single event that occurs in the same location or background among events that constitute the content. For example, among the frame images included in the video content, frame images having the same location or background may be determined to be frame images of the same scene.

According to some embodiments, the display device 100 may extract feature information of a frame image in which a scene changes, but may not extract feature information of a frame image in which a scene is the same as that for a previous frame image.

For example, as shown in FIG. 8A, for a frame image (e.g., a first frame image 801) of a scene that is different from that for a previous frame image among the frame images included in the video content, the display device 100 may extract feature information 803 of the first frame image by using a first neural network 810.

On the other hand, as shown in FIG. 8B, for a frame image (e.g., a second frame image 811) of the same scene as that for the previous frame image (e.g., the first frame image 801) among the frame images included in the video content, the display device 100 may not extract feature information of the second frame image 811 but use the feature information 803 extracted from the previous frame image.

Furthermore, the display device 100 may obtain downscaled images by performing downscaling of each of the frame images. In this case, the display device 100 may perform downscaling by using one or more neural networks, but is not limited thereto.

According to some embodiments, the display device 100 may obtain style-transferred frame images by using a second neural network 820.

In this case, the second neural network 820 may be a network trained to take a downscaled version of a frame image, feature information of the frame image, and a style feature as inputs, and output a style-transferred frame image.

For example, as shown in FIG. 8A, when the frame image (e.g., the first frame image 801) of the scene that is different from that for the previous frame image among the frame images included in the video content is input to the style transfer unit 630, the display device 100 may input a downscaled version 850 of the first frame image 801, the feature information 803 of the first frame image 801, which is extracted by the first neural network 810, and a style feature 830 to the second neural network 820 to thereby obtain a style-transferred first frame image 802. In this case, when the first frame image has a first style and the style feature 830 corresponds to a second style 840, the first frame image 802 having the second style may be output from the second neural network 820.

On the other hand, as shown in FIG. 8B, when the frame image (e.g., the second frame image 811) of the same scene as for the previous frame image (e.g., the first frame image 801) among the frame images included in the video content is input to the style transfer unit 630, the display device 100 may input a downscaled version 851 of the second frame image 811, the feature information 803 of the first frame image 801, and the style feature 830 to the second neural network 820 to thereby obtain a style-transferred second frame image 812. In this case, when the second frame image 811 has the first style and the style feature 830 corresponds to the second style 840, the second frame image 812 having the second style 840 may be output from the second neural network 820.

The second neural network 820 may detect a change in content of the second frame image 811 (the current frame image) based on the downscaled version 851 of the second frame image 811 and the downscaled version 850 of the first frame image 801 (the previous frame image), and output the style-transferred second frame image 812 by applying the change in the content of the second frame image 811 in addition to the feature information 803 of the first frame image 801 and the style feature 830.

Here, the feature information 803 of the first frame image input to the second neural network 820 is data extracted during processing of the first frame image 801, rather than data newly extracted using the first neural network 810 during processing of the second frame image 811. Thus, for frame images of the same scene included in the video content, feature information of one frame image may be extracted, and style transfer of the other frame images of the same scene may be performed using the extracted feature information, thereby reducing the amount of computation and cost required.

Figure 9:
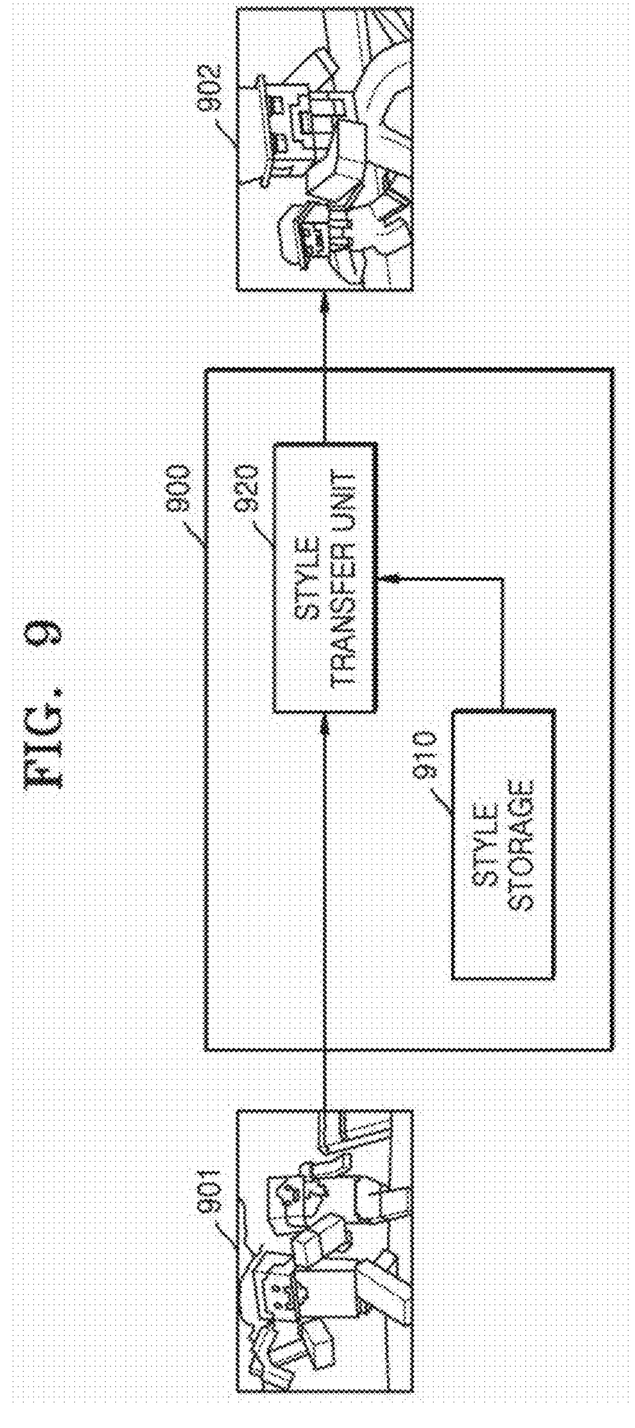
FIG. 9 is a diagram illustrating a device (or module) for performing style transfer on image content, according to some embodiments.

FIG. 9 is a diagram illustrating a device (or module) for performing style transfer on image content, according to another embodiment.

A style transfer device (or module) 900 according to another embodiment may be included in a part of the display device 100 shown in FIG. 12 or in a part of the display device 1300 shown in FIG. 13.

Referring to FIG. 9, according to some embodiments, the style transfer device (or module) 900 may include a style storage 910 and a style transfer unit 920.

The style storage 910 may store a plurality of style images. In this case, the plurality of style images may be images received from an external device or external server.

A style image may be an image having a specific pattern or format of style. For example, the style image may include, but is not limited to, an image representing a specific artist's painting style, an image representing a specific format, an image representing a specific character, an image representing a specific texture, etc.

The style transfer unit 920 may include the one or more neural networks. The style transfer unit 920 may include appropriate logic, circuitry, interface, and/or code operable to transfer the style of input image content.

A configuration of the style transfer unit 920 is described in detail with reference to FIG. 10.

Figure 10:
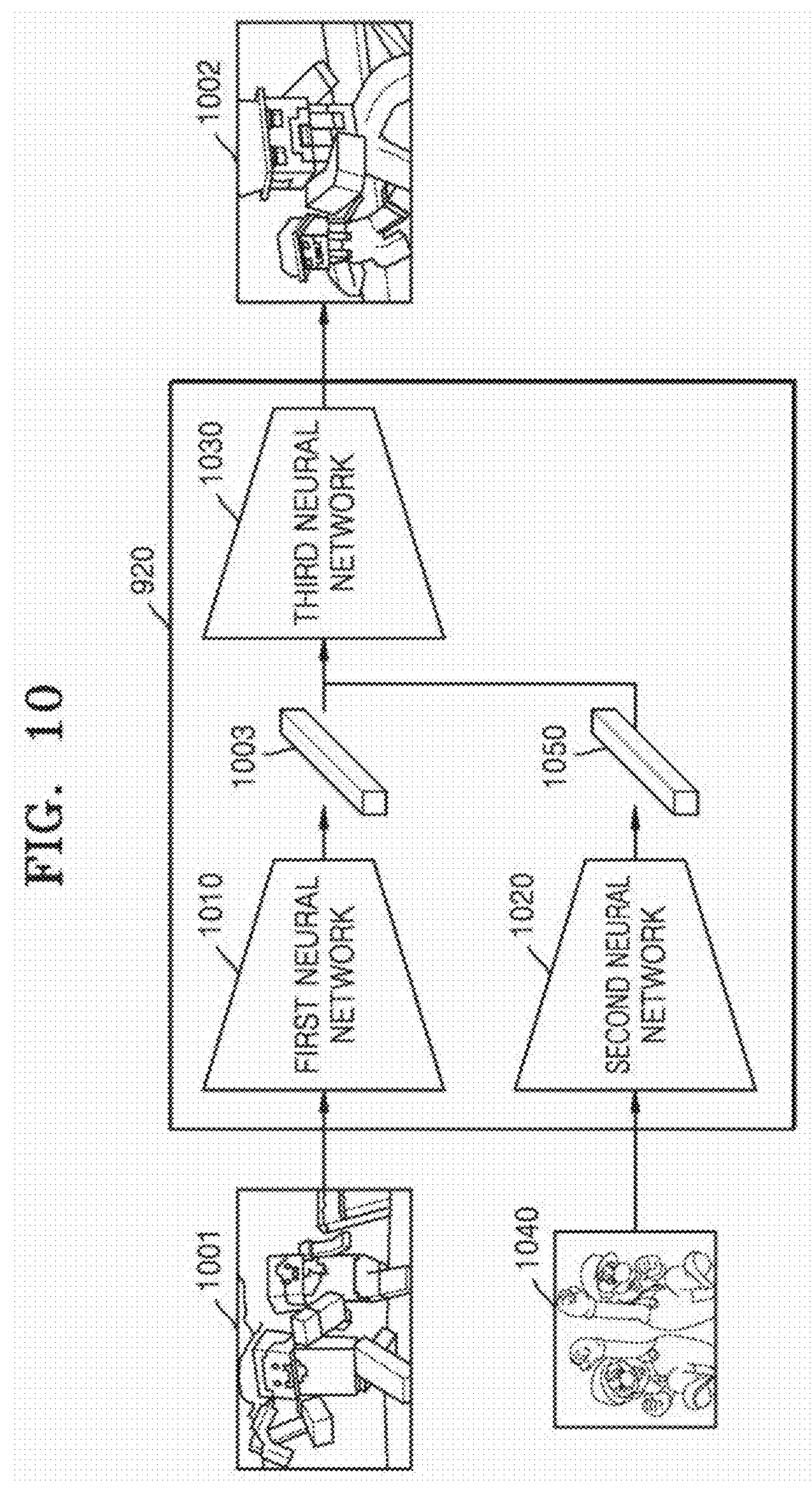
FIG. 10 is a diagram illustrating a style transfer unit according to some embodiments.

FIG. 10 is a diagram illustrating a style transfer unit according to another embodiment.

Referring to FIG. 10, a style transfer unit 920 may include a first neural network 1010, a second neural network 1020, and a third neural network 1030. Here, the first neural network 1010 and the second neural network 1020 may be referred to as an encoder network, and the third neural network 1030 may be referred to as a decoder network.

The first neural network 1010 may be a network trained to receive image content 1001 as an input and extract feature information 1003 about the image content 1001.

When the image content 1001 is a moving image or video content, each of frame images included in the video content may be input to the first neural network 1010. The first neural network 1010 may output feature information about each of the frame images (input images). In this case, the feature information 1003 extracted using the first neural network 1010 may represent a feature of content of an input image.

The second neural network 1020 may be a network trained to take a style image 1040 as an input and extract a style feature 1050 corresponding to the style image 1040. The second neural network 1020 may take as an input a style image selected based on a user input and extract a style feature corresponding to the style image.

The third neural network 1030 may be a network trained to take as inputs the feature information 1003 about the input image, which is output from the first neural network 1010, and the style feature 1050 extracted using the second neural network 1020 and output a style-transferred image 1002.

For example, when the image content input to the first neural network 1010 has a first style and the style feature 1050 extracted using the second neural network 1020 corresponds to a second style, the third neural network 1030 may output the image content 1002 having the second style. The image content output from the third neural network 1030 may be image content having the same content as the image content 1001 input to the first neural network 101 while having only the style transferred from the first style to the second style extracted by the second neural network 1020.

Figure 11A:
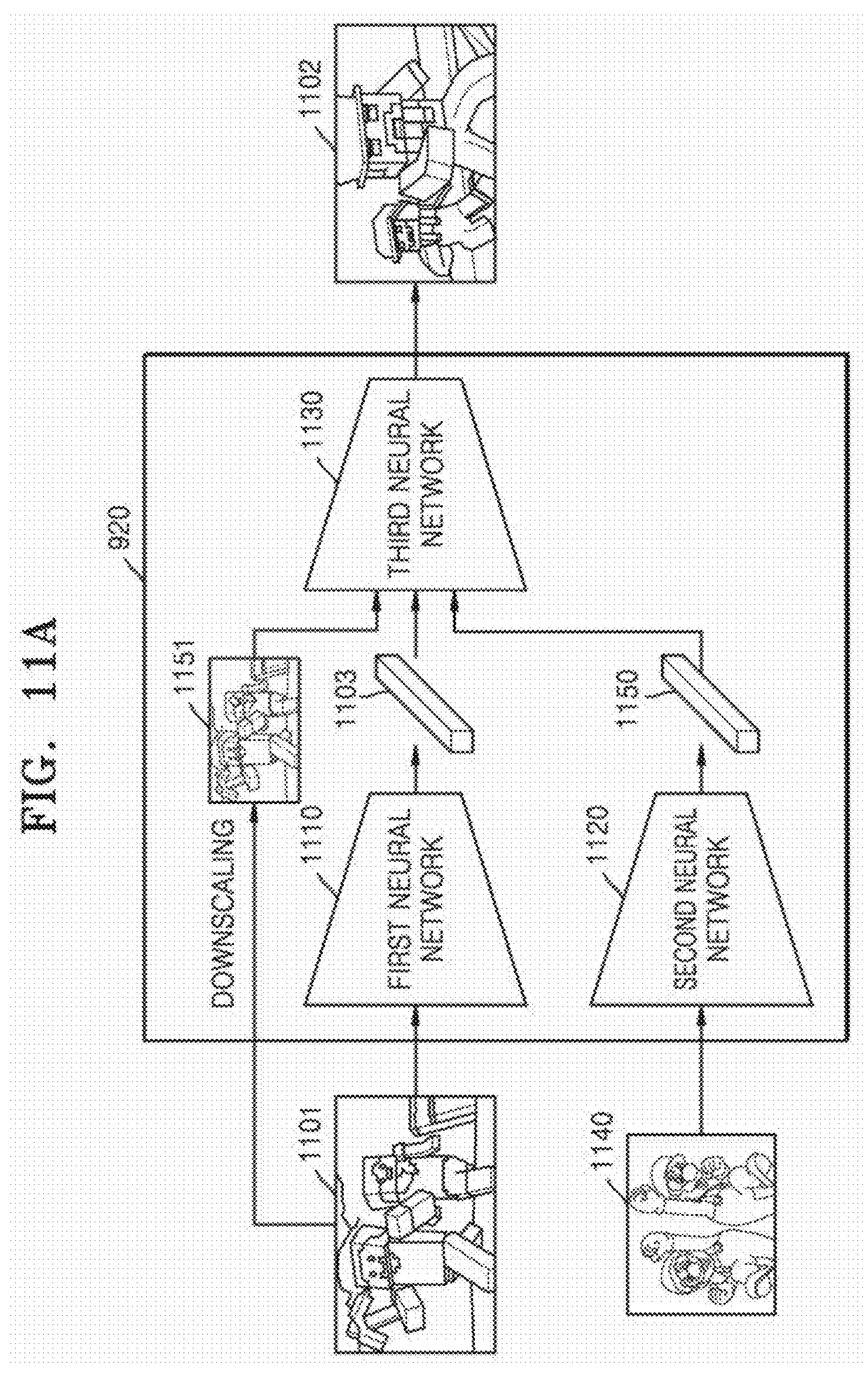
FIGS. 11A and 11B are diagrams illustrating a method, performed by a display device, of performing style transfer on video content, according to some embodiments.
Figure 11B:
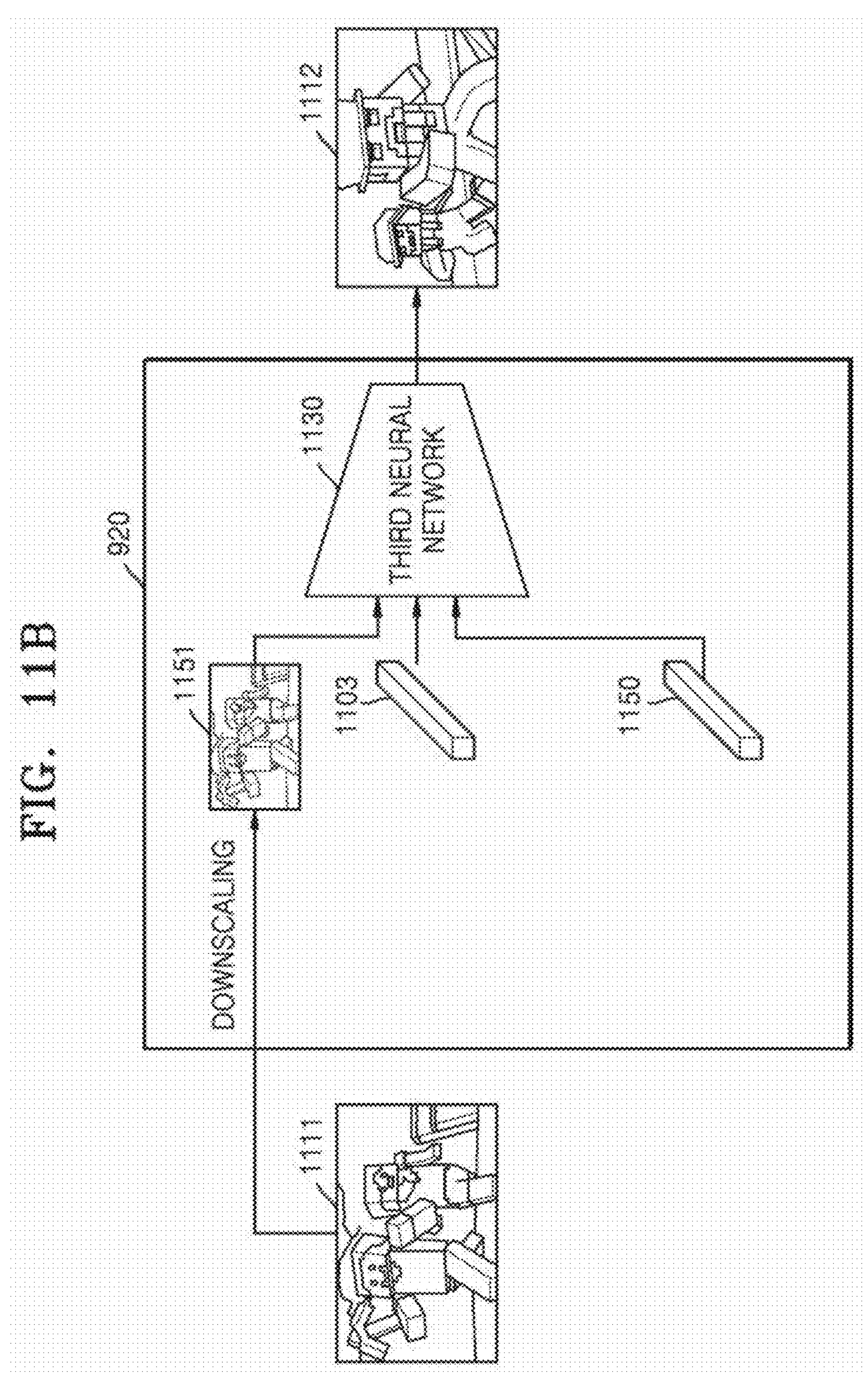

FIGS. 11A and 11B are diagrams illustrating a method, performed by a display device, of performing style transfer on video content, according to some embodiments.

According to some embodiments, the display device 100 may detect a change of a scene in frame images included in received video content.

According to some embodiments, the display device 100 may extract feature information of a frame image in which a scene changes, but not extract feature information of a frame image in which a scene is the same as that for a previous frame image.

For example, as shown in FIG. 11A, when a frame image (e.g., a first frame image 1101) of a scene that is different from that for a previous frame image among the frame images included in the video content is input to the style transfer unit 920, the display device 100 may extract feature information 1103 of the first frame image 1101 by using a first neural network 1110.

On the other hand, as shown in FIG. 11B, when a frame image (e.g., a second frame image 1111) of the same scene as for the previous frame image (e.g., the first frame image 1101) among the frame images included in the video content is input to the style transfer unit 920, the display device 100 may not extract feature information of the second frame image 1111 but use the feature information 1103 extracted from the previous frame image.

Furthermore, the display device 100 may obtain downscaled images by performing downscaling of each of the frame images. In this case, the display device 100 may perform downscaling by using one or more neural networks, but is not limited thereto.

When styles applied to the video content are the same, according to some embodiments, the display device 100 may extract a style feature 1150 corresponding to a style image 1140 only once by using a second neural network 1120, and use the extracted style feature 1150 for processing style transfer of the plurality of frame images included in the video content.

According to some embodiments, the display device 100 may obtain style-transferred frame images by using a third neural network 1130.

In this case, the third neural network 1130 may be a network trained to take a downscaled version of a frame image, feature information of the frame image, and the style feature 1150 as inputs and output a style-transferred frame image. For example, as shown in FIG. 11A, when the frame image (e.g., the first frame image 1101) of the scene that is different from that for the previous frame image among the frame images included in the video content is input to the style transfer unit 920, the display device 100 may input to the third neural network 1130 a downscaled version 1151 of the first frame image, the feature information 1103 of the first frame image, which is extracted by the first neural network 1110, and the style feature 1150 extracted by the second neural network 1120 to thereby obtain a style-transferred first frame image 1102. In this case, when the first frame image 1101 has a first style and the style feature 1150 corresponds to a second style, the first frame image 1102 having the second style may be output from the third neural network 1130.

On the other hand, as shown in FIG. 11B, when the frame image (e.g., the second frame image 1111) of the same scene as for the previous frame image (e.g., the first frame image 1101) among the frame images included in the video content is input to the style transfer unit 920, the display device 100 may input a downscaled version 1151 of the second frame image 1111, the feature information 1103 of the first frame image 1101, and the style feature 1150 to the third neural network 1130 to thereby obtain a style-transferred second frame image 1112. In this case, when the second frame image 1111 has the first style and the style feature 1150 corresponds to the second style, the second frame image 1112 having the second style may be output from the third neural network 1130.

The third neural network 1130 may detect a change in content of the second frame image 1111 (the current frame image) based on the downscaled version of the second frame image 1111 and the downscaled version of the first frame image 1101 (the previous frame image), and output the style-transferred second frame image 1112 by applying the change in the content of the second frame image 1111 in addition to the feature information 1103 of the first frame image 1101 and the style feature 1150.

Here, the feature information 1103 of the first frame image 1101 input to the third neural network 1130 is data extracted during processing of the first frame image 1101, rather than data newly extracted by the first neural network 1110 during processing of the second frame image 1111. Thus, for frame images of the same scene included in the video content, feature information of one frame image may be extracted, and style transfer of the other frame images of the same scene may be performed using the extracted feature information, thereby reducing the amount of computation and cost required.

FIG. 12 is a block diagram of a configuration of a display device according to some embodiments.

Referring to FIG. 12, a display device 100 according to some embodiments may include an image receiver 110, a processor 120, a memory 130, a display 140, and a wireless communication unit 150.

According to some embodiments, the image receiver 110 may include a communication interface, an I/O interface, etc. For example, the communication interface may transmit or receive data or signals to or from an external device or a server. For example, the communication interface may include a Wi-Fi module, a Bluetooth module, an infrared (IR) communication module, a wireless communication module, a local area network (LAN) module, an Ethernet module, a wired communication module, etc. In this case, each communication module may be implemented in the form of at least one hardware chip.

The Wi-Fi module and the Bluetooth module perform communications via a Wi-Fi method and a Bluetooth method, respectively. When the Wi-Fi module or the Bluetooth module is used, various types of connection information such as a service set identifier (SSID) and a session key may be first transmitted and received, a communication connection may be established using the connection information, and then various types of information may be transmitted and received. The wireless communication module may include at least one communication chip for performing communication according to various communication standards such as ZigBee, 3rd generation (3G), 3rd Generation Partnership Project (3GPP), long-term evolution (LTE), LTE Advanced (LTE-A), 4th generation (4G), 5th generation (5G), etc.

Alternatively, the I/O interface receives video (e.g., a moving image, etc.), audio (e.g., voice, music, etc.), additional information (e.g., an electronic program guide (EPG), etc.), etc. from outside the display device 100. The I/O interface may include one of a high-definition multimedia interface (HDMI), a mobile high-definition link (MHL), a universal serial bus (USB), a Display Port (DP), a Thunderbolt port, a video graphics array (VGA) port, an RGB port, a D-subminiature (D-sub), a digital visual interface (DVI), a component jack, and a PC port.

According to some embodiments, the image receiver 110 may receive one or more pieces of image content. For example, the image receiver 110 may receive game content from a gaming device connected to the display device 100. However, the image receiver 110 is not limited thereto.

According to some embodiments, the processor 120 controls all operations of the display device 100 and a flow of signals between the internal components of the display device 100 and performs a function of processing data.

The processor 120 may include a single core, a dual core, a triple core, a quad core, or a number of cores equal to multiples of thereof. Furthermore, the processor 120 may include a plurality of processors. For example, the processor 120 may be implemented as a main processor (not shown) and a sub processor (not shown) operating in a sleep mode.

In addition, the processor 120 may include at least one of a central processing unit (CPU), a graphics processing unit (GPU), and a video processing unit (VPU). Alternatively, according to some embodiments, the processor 120 may be implemented as a system on chip (SoC) that integrates at least one of a CPU, a GPU, and a VPU. Alternatively, the processor 140 may further include a neural processing unit (NPU).

According to some embodiments, the memory 130 may store various pieces of data, programs, or applications for driving and controlling the display device 100.

Also, a program stored in the memory 130 may include one or more instructions. A program (one or more instructions) or an application stored in the memory 130 may be executed by the processor 120.

According to some embodiments, the processor 120 may include at least one of the components included in the device (or module) 600 or 900 performing the processing as described with reference to FIGS. 6 and 9.

According to some embodiments, the processor 120 may obtain a style feature to be applied to received image content. According to some embodiments, the memory 130 may prestore a plurality of style images. The processor 120 may obtain a style feature from a style image selected based on a user input from among the plurality of style images. The style feature may be feature information extracted from the style image. By inputting the style image to one or more neural networks, the processor 120 may extract the style feature corresponding to the style image.

Alternatively, according to some embodiments, the memory 130 may prestore style features corresponding to the plurality of style images. The processor 120 may obtain, from among the plurality of style features, a style feature selected based on a user input.

The processor 120 may transfer a style of the image content based on the obtained style feature. The processor 120 may extract feature information about the image content by using a first neural network and input the feature information and the style feature to a second neural network, thereby outputting style-transferred image content.

In this case, when the image content is video content including a plurality of frame images, the processor 120 may detect a change of a scene in the frame images. The processor 120 may extract feature information of a frame image in which a scene changes, but may not extract feature information of a frame image in which a scene is the same as that for a previous frame image. For example, for a first frame image in which a scene changes, the processor 120 may extract feature information of the first frame image by using the first neural network. Furthermore, the processor 120 may obtain a downscaled version of the first frame image by downscaling the first frame image. The processor 120 may obtain a style-transferred first frame image by inputting the downscaled version of the first frame image, the feature information of the first frame image, which is extracted by the first neural network, and the style feature to the second neural network.

On the other hand, for a second frame image in which a scene is the same as for the previous frame image (e.g., the first frame image), the processor 120 may not extract feature information of the second frame image but use the feature information of the first frame image. For example, the processor 120 may obtain a style-transferred second frame image by inputting to the second neural network a downscaled image obtained by downscaling the second frame image, the feature information of the first frame image, and the style feature. Accordingly, for frame images of the same scene included in the video content, feature information of one frame image may be extracted, and style transfer of the other frame images of the same scene may be performed using the extracted feature information, thereby reducing the amount of computation and cost required.

The processor 120 may control the display 140 to display style-transferred frame images.

According to some embodiments, the display 140 generates a driving signal by converting an image signal, a data signal, an on-screen display (OSD) signal, a control signal, etc. processed by the processor 120. The display 140 may be implemented as a plasma display panel (PDP), a liquid crystal display (LCD), an organic light-emitting diode (OLED) display, a flexible display, or the like, and may also be implemented as a 3D display. Furthermore, the display 140 may be formed as a touch screen to serve as an input device as well as an output device.

According to some embodiments, in correspondence to the performance and structure of the display device 100, the wireless communication unit 150 may transmit and receive data or signals via IR, Bluetooth, Bluetooth Low Energy (BLE), and wireless LAN (e.g., Wi-Fi). ultrasonic waves, ZigBee, etc.

The wireless communication unit 150 may transmit and receive signals to and from the control device 1000 according to control by the processor 120. The wireless communication portion 150 may include an IR module capable of transmitting and receiving signals to and from the control device 1000 according to the IR communication standard. However, the wireless communication unit 150 is not limited thereto.

According to some embodiments, the wireless communication unit 150 may receive control signals related to game mode settings or style settings from the control device 1000.

FIG. 13 is a block diagram of a configuration of a display device according to another embodiment.

Referring to FIG. 13, a display device 1300 of FIG. 13 may be some embodiments of the display device 100 described with reference to FIGS. 1 to 12.

Referring to FIG. 13, according to some embodiments, the display device 1300 may include a tuner 1340, a processor 1310, a display 1320, a communication unit 1350, a sensor unit 1330, an I/O interface 1370, a video processor 1380, an audio processor 1385, an audio output interface 1360, a memory 1390, and a power supply 1395.

The communication unit 1350 of FIG. 13 is a component including the communication interface and the wireless communication unit 150 included in the image receiver 110 of FIG. 12, the I/O interface 1370 of FIG. 13 is a component corresponding to the I/O interface included in the image receiver 110 of FIG. 12, the processor 1310 of FIG. 13 is a component corresponding to the processor 120 of FIG. 12, the memory 1390 of FIG. 13 is a component corresponding to the memory 130 of FIG. 12, and the display 1320 of FIG. 13 is a component corresponding to the display 140 of FIG. 12. Thus, descriptions already provided above are omitted.

According to some embodiments, the tuner 1340 may tune and then select only a frequency of a channel desired to be received among many radio wave components by performing amplification, mixing, resonance, etc. of a broadcast signal received in a wired or wireless manner. The broadcast signal includes audio, video, and additional information (e.g., an EPG).

The tuner 1340 may receive broadcast signals from various sources such as terrestrial broadcasting, cable broadcasting, satellite broadcasting, Internet broadcasting, etc. The tuner 1340 may receive a broadcast signal from a source such as analog broadcasting, digital broadcasting, or the like.

The sensor unit 1330 detects a user's voice, images, or interactions and may include a microphone 1331, a camera 1332, and a light receiver 1333.

The microphone 1331 may receive a voice uttered by the user. The microphone 1331 may convert the received voice into an electrical signal and output the electrical signal to the processor 1310. The user's voice may include, for example, a voice corresponding to a menu or function of the display device 1300.

The camera 1332 may receive an image (e.g., consecutive frames) corresponding to a user's motion including his or her gesture performed within a recognition range of the camera 1332. The processor 1310 may select a menu displayed on the display device 1300 based on a received motion recognition result or perform control corresponding to the motion recognition result.

The light receiver 1333 receives an optical signal (including a control signal) from an external control device via a light window (not shown) on a bezel of the display 1320. The light receiver 1333 may receive, from the control device, an optical signal corresponding to a user input (e.g., touching, pressing, touch gesture, voice, or motion). A control signal may be extracted from the received optical signal according to control by the processor 1310.

The processor 1310 controls all operations of the display device 1300 and a flow of signals between the internal components of the display device 1300 and performs a function of processing data. When there is an input by the user, or preset and stored conditions are satisfied, the processor 1310 may execute an operating system (OS) and various applications stored in the memory 1390.

The processor 1310 may include random access memory (RAM) that stores signals or data input from outside the display device 1300 or is used as a storage area corresponding to various operations performed by the display device 1300, read-only memory (ROM) that stores a control program for controlling the display device 1300, and a processor.

The video processor 1380 processes video data received by the display device 1300. The video processor 1380 may perform various types of image processing, such as decoding, scaling, noise removal, frame rate conversion, resolution conversion, etc. on the video data.

The audio processor 1385 processes audio data. The audio processor 1385 may perform various types of processing, such as decoding, amplification, noise removal, etc., on the audio data. Moreover, the audio processor 1385 may include a plurality of audio processing modules to process audio corresponding to a plurality of pieces of content.

The audio output interface 1360 outputs audio contained in a broadcast signal received via the tuner 1340 according to control by the processor 1310. The audio output interface 1360 may output audio (e.g., a voice and a sound) input via the communication unit 1350 or the I/O interface 1370.

Furthermore, the audio output interface 1360 may output audio stored in the memory 1390 according to control by the processor 1310. The audio output interface 1360 may include at least one of a speaker, a headphone output terminal, or a Sony/Phillips Digital Interface (S/PDIF) output terminal.

The power supply 1395 supplies, according to control by the processor 1310, power input from an external power source to the internal components of the display device 1300. The power supply 1395 may also supply, according to control by the processor 1310, power output from one or more batteries (not shown) located within the display device 1300 to the internal components.

The memory 1390 may store various pieces of data, programs, or applications for driving and controlling the display device 1300 according to control by the processor 1310. Although not shown, the memory 1390 may include a broadcasting receiving module, a channel control module, a volume control module, a communication control module, a voice recognition module, a motion recognition module, a light receiving module, a display control module, an audio control module, an external input control module, a power control module, a power control module for an external device connected wirelessly (e.g., via Bluetooth), a voice database (DB), or a motion DB. The modules and DBs of the memory 1390 not shown in FIG. 13 may be implemented in the form of software in order to perform a broadcast reception control function, a channel control function, a volume control function, a communication control function, a voice recognition function, a motion recognition function, a light receiving control function, a display control function, an audio control function, an external input control function, a power control function, or a power control function of the external device connected wirelessly (e.g., via Bluetooth). The processor 1310 may perform the respective functions by using the software stored in the memory 1390.

Moreover, the block diagrams of the display devices 100 and 1300 respectively illustrated in FIGS. 12 and 13 are block diagrams for some embodiments. The components in the block diagrams may be integrated, added, or omitted according to specifications of the display devices 100 and 1300 that are actually implemented. In other words, two or more components may be combined into a single component, or a single component may be subdivided into two or more components when necessary. Furthermore, functions performed in each block are intended to describe embodiments, and a specific operation or a device related to the functions does not limit the scope of the present disclosure.

A display device according to some embodiments may include a display and an image receiver receiving video content having a first style. The display device may include a memory storing one or more instructions, and at least one processor configured to execute the one or more instructions stored in the memory. The processor may execute the one or more instructions to obtain a feature corresponding to a second style. The processor may execute the one or more instructions to transfer, by one or more neural networks, a style of frame images of the video content from the first style to the second style based one the feature. The processor may execute the one or more instructions to control the display to display frame images having the second style.

The memory may store at least one of a plurality of features or a plurality of style images, which correspond to a plurality of styles.

The display device may further include a wireless communication unit receiving a user input for selecting one of the plurality of styles.

The at least one processor may obtain the feature corresponding to the one of the plurality of styles selected in the user input.

The at least one processor may execute the one or more instructions to obtain a style image having the second style.

The processor may execute the one or more instructions to extract the feature from the style image by using a feature extraction network.

The display device may further include a communication unit communicating with an external device.

The at least one processor may execute the one or more instructions to control the communication unit to receive the style image from the external device.

The display device may further include a wireless communication unit receiving a user input for switching an operation of the display device to a game mode.

The video content may be game content.

The at least one processor may execute the one or more instructions to control the display device to operate in the game mode, based on the user input for switching the operation of the display device to the game mode.

The at least one processor may execute the one or more instructions to provide a user interface for selecting the feature, based on the display device operating in the game mode.

The at least one processor may execute the one or more instructions to control the display to display a style settings menu for selecting one of a plurality of styles, based on the display device operating in the game mode.

The at least one processor may execute the one or more instructions to extract feature information of a first frame image among the frame images by using a first neural network.

The at least one processor may execute the one or more instructions to input the feature information and the feature to obtain the first frame image having the style transferred to the second style by inputting the feature information and the feature to a second neural network.

The at least one processor may execute the one or more instructions to extract the feature from a style image corresponding to the second style by using a third neural network.

The at least one processor may execute the one or more instructions to obtain a downscaled version of a second frame image that is included in the same scene as the first frame image.

The at least one processor may execute the one or more instructions to input the feature information, the feature, and the downscaled version of the second frame image to the second neural network to obtain a second frame image having the style transferred to the second style.

An operation method of a display device, according to some embodiments, may include receiving video content having a first style.

According to some embodiments, the operation method of the display device may include obtaining a feature corresponding to a second style.

According to some embodiments, the operation method of the display device may include transferring, by one or more neural networks, a style of frame images included in the video content from the first style to the second style based on the feature.

According to some embodiments, the operation method of the display device may include displaying the frame images having the second style.

The operation method may include storing at least one of a plurality of features or a plurality of style images, which correspond to a plurality of styles.

The operation method may further include receiving a user input for selecting one of the plurality of styles.

The obtaining of the feature corresponding to the second style may include obtaining the feature corresponding to the one or more of the plurality of styles selected in the user input.

The operation method may further include a style image having the second style.

The obtaining of the feature may include extracting the feature from the style image by using a feature extraction network.

The obtaining of the style image corresponding to the second style may further include receiving the style image from an external device.

The operation method may include receiving a user input for switching an operation of the display device to a game mode.

The operation method may include operating, by the display device, in the game mode based on the user input.

The operation method may include providing a user interface for selecting the feature, based on the display device operating in the game mode.

The video content may be game content.

The providing of the user interface for selecting the feature may include displaying a style settings menu for selecting one of a plurality of styles, based on operating in the game mode.

The transferring of the style of the frame images included in the video content from the first style to the second style may include extracting feature information of a first frame image among the frame images by using a first neural network.

The transferring of the style of the frame images included in the video content from the first style to the second style may include obtaining a first frame image having a style transferred to the second style by inputting the feature information and the feature to a second neural network.

The obtaining of the feature may include extracting the feature from a style image corresponding to the second style by using a third neural network.

The transferring of the style of the frame images included in the video content from the first style to the second style may include a downscaled version of a second frame image that is included in the same scene as that for the first frame image from among the frame images.

The transferring of the style of the frame images included in the video content from the first style to the second style may include obtaining a second frame image having a style transferred to the second style by inputting the feature information, the feature, and the downscaled image to the second neural network.

A display device according to some embodiments may provide the effect of converting graphics (e.g., a game skin) of game content by transferring a style of the game content without being provided with software (e.g., a game skin pack) for transforming the graphics of the game content.

According to some embodiments, because style transfer of the game content is performed on the display device, the display device may convert the graphics of the game content regardless of the performance and type of a device for playing the game content.

According to some embodiments, the display device may apply a single style to various types of game content regardless of the type of game content.

An operation method of a display device, according to some embodiments, may be implemented in the form of program commands that may be performed by various types of computers, and may be recorded on computer-readable recording media. The computer-readable recording media may be transitory or non-transitory. The computer-readable recording media may include program commands, data files, data structures, etc. either alone or in combination. The program commands recorded on the computer-readable recording media may be designed and configured specially for the present disclosure or may be known to and be usable by those of ordinary skill in the art of computer software. Examples of the computer-readable recording media include magnetic media such as hard disks, floppy disks, and magnetic tapes, optical media such as compact disk ROM (CD-ROM) and digital versatile disks (DVDs), magneto-optical media such as floptical disks, and hardware devices that are specially configured to store and perform program commands, such as ROM, RAM, flash memory, etc. Examples of program commands include not only machine code such as that created by a compiler but also high-level language code that may be executed by a computer using an interpreter or the like.

In addition, operation methods of a display device according to disclosed embodiments may be included in a computer program product when provided. The computer program product may be traded, as a product, between a seller and a buyer.

The computer program product may include a software program and a computer-readable storage medium having the software program stored thereon. For example, the computer program product may include a product (e.g., a downloadable application) in the form of a software program electronically distributed by a manufacturer of an electronic device or through an electronic market (e.g., Google Play Store™, and App Store™). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system consisting of a server and a client device, the computer program product may include a storage medium of the server or a storage medium of the client device. Alternatively, in a case where there is a third device (e.g., a smartphone) communicatively connected to the server or client device, the computer program product may include a storage medium of the third device. Alternatively, the computer program product may include a software program itself that is transmitted from the server to the client device or the third device or that is transmitted from the third device to the client device.

In this case, one of the server, the client device, and the third device may execute the computer program product to perform methods according to disclosed embodiments. Alternatively, at least two of the server, the client device, and the third device may execute the computer program product to perform the methods according to the disclosed embodiments in a distributed manner.

For example, the server (e.g., a cloud server, an artificial intelligence server, or the like) may execute the computer program product stored therein to control the client device communicatively connected to the server to perform the methods according to the disclosed embodiments.

While example embodiments of the disclosure have been shown and described, the disclosure is not limited to the aforementioned specific embodiments, and it is to be understood that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A display device comprising:

a display;

an image receiver configured to receive game content having a first style;

a memory storing one or more instructions and comprising one or more neural networks; and at least one processor configured to execute the one or more instructions stored in the memory to:

obtain a first feature information of a first frame image among frame images of the game content;

obtain a feature corresponding to a second style;

transfer, by using the one or more neural networks, a style of the first frame image from the first style to the second style based on the first feature information and the feature; and control the display to display the first frame images image having the second style, wherein the transferring the style of the first frame image includes converting an appearance of characters or a background style in the first frame image while maintaining content features of the characters or background in the first frame image, and wherein the at least one processor is further configured to execute the one or more instructions to, based on a scene of the first frame image being different from a scene of a previous frame image, extract the first feature information of the first frame image by using a first neural network.

2. The display device of claim 1, wherein the memory is configured to store at least one of a plurality of features or a plurality of style images corresponding to a plurality of styles, wherein the display device further comprises a wireless communication interface configured to receive a user input for selecting one of the plurality of styles, and wherein the at least one processor is further configured to obtain the feature corresponding to the one of the plurality of styles selected in the user input.

3. The display device of claim 1, wherein the at least one processor is further configured to execute the one or more instructions to:

obtain a style image having the second style; and extract the feature from the style image via a feature extraction network.

4. The display device of claim 3, further comprising a communication interface configured to communicate with an external device, wherein the at least one processor is further configured to execute the one or more instructions to control the communication interface to receive the style image from the external device.

5. The display device of claim 1, further comprising;

a wireless communication interface configured to receive a user input for switching an operation of the display device to a game mode, wherein the at least one processor is further configured to execute the one or more instructions to:

control the display device to operate in the game mode based on the user input for switching the operation of the display device to the game mode; and provide a user interface for selecting the feature based on the display device operating in the game mode.

6. The display device of claim 5, wherein the at least one processor is further configured to execute the one or more instructions to control the display to display a style settings menu for selecting one of a plurality of styles based on the display device operating in the game mode.

7. The display device of claim 1, wherein the at least one processor is further configured to execute the one or more instructions to:

obtain the first frame image having the style transferred to the second style by inputting the first feature information and the feature to a second neural network.

8. The display device of claim 7, wherein the at least one processor is further configured to execute the one or more instructions to extract, by a third neural network, the feature from a style image corresponding to the second style.

9. The display device of claim 7, wherein the at least one processor is further configured to execute the one or more instructions to:

obtain a downscaled version of a second frame image that is included in a same scene as the first frame image; and obtain the second frame image having the style transferred to the second style by inputting the first feature information, the feature, and the downscaled version of the second frame image to the second neural network.

10. An operation method of a display device, the operation method comprising:

receiving game content having a first style;

obtaining a first feature information of a first frame image among frame images of the game content;

obtaining a feature corresponding to a second style;

transferring, by using one or more neural networks, a style of the first frame image from the first style to the second style based one on the first feature information and the feature; and displaying the first frame image having the second style, wherein the transferring the style of the first frame image includes converting an appearance of characters or a background style in the first frame image while maintaining content features of the characters or background in the first frame image, and wherein the obtaining the first feature information of the first frame image includes based on a scene of the first frame image being different from a scene of a previous frame image, extracting the first feature information of the first frame image by using a first neural network.

11. The operation method of claim 10, further comprising:

storing at least one of a plurality of features or a plurality of style images, corresponding to a plurality of styles; and receiving a user input for selecting one of the plurality of styles, wherein the obtaining of the feature corresponding to the second style comprises obtaining the feature corresponding to the one of the plurality of styles selected in the user input.

12. The operation method of claim 10, further comprising obtaining a style image having the second style, and wherein the obtaining of the feature corresponding to the second style comprises extracting the feature from the style image via a feature extraction network.

13. The operation method of claim 12, wherein the obtaining of the style image corresponding to the second style further comprises receiving the style image from an external device.

14. The operation method of claim 10, further comprising:

receiving a user input for switching an operation of the display device to a game mode;

operating, by the display device, in the game mode based on the user input; and providing a user interface for selecting the feature based on the display device operating in the game mode.

15. A non-transitory computer-readable recording medium having stored thereon a program for performing the operation method of claim 10.

* * * * *